(12) United States Patent
Sako et al.

(10) Patent No.: US 7,876,374 B2
(45) Date of Patent: Jan. 25, 2011

(54) IMAGE DISPLAY SYSTEM, DISPLAY APPARATUS, AND DISPLAY METHOD

(75) Inventors: Yoichiro Sako, Tokyo (JP); Keiji Kimura, Tokyo (JP); Masaaki Tsuruta, Tokyo (JP); Masamichi Asukai, Kanagawa (JP); Taiji Ito, Kanagawa (JP); Nozomu Ozaki, Kanagawa (JP); Akinobu Sugino, Kanagawa (JP); Hidehiko Sekizawa, Tokyo (JP); Yonetaro Totsuka, Chiba (JP)

(73) Assignee: Sony Corporation, Tokyo (JP)

( * ) Notice: Subject to any disclaimer, the term of this patent is extended or adjusted under 35 U.S.C. 154(b) by 369 days.

(21) Appl. No.: 11/978,407

(22) Filed: Oct. 29, 2007

(65) Prior Publication Data

US 2008/0259199 A1 Oct. 23, 2008

(30) Foreign Application Priority Data

Dec. 7, 2006 (JP) ............................. 2006-330833

(51) Int. Cl.
*H04N 5/222* (2006.01)
(52) U.S. Cl. ................................ 348/333.01
(58) Field of Classification Search ............. 348/333.01
See application file for complete search history.

(56) References Cited

U.S. PATENT DOCUMENTS

| | | | |
|---|---|---|---|
| 6,091,546 A | 7/2000 | Spitzer | |
| 6,181,371 B1 | 1/2001 | Maguire, Jr. | |
| 6,466,862 B1 | 10/2002 | Dekock et al. | |
| 6,549,231 B1 | 4/2003 | Matsui | |
| 6,629,104 B1 | 9/2003 | Parulski et al. | |
| 7,183,909 B2 | 2/2007 | Miyajima | |
| 7,286,753 B2 | 10/2007 | Yamasaki | |
| 2001/0005230 A1 | 6/2001 | Ishikawa | |

(Continued)

FOREIGN PATENT DOCUMENTS

CN 1605974 A 4/2005

(Continued)

OTHER PUBLICATIONS

Healey, Jennifer et al.: "StartleCam: A Cybernetic Wearable Camera,". Digest of Papers. Second Internationl Symposium on Wearable Computers, 1998 Pittsburgh, PA USA Oct. 19-20, 1998, pp. 42-49.

*Primary Examiner*—James M Hannett
(74) *Attorney, Agent, or Firm*—Wolf, Greenfield & Sacks, P.C.

(57) ABSTRACT

Disclosed herein is an image display system including a display apparatus, an imaging apparatus placed on a movable body; and a server apparatus. The display apparatus and the imaging apparatus are capable of communicating with the server apparatus. The imaging apparatus includes: an imaging section; a speed detection section; and a control section that controls transmission of image data and speed information to the server apparatus. The server apparatus includes: a movable body speed management section that manages the moving speed of the movable body using the speed information; and a control section that identifies an imaging apparatus that matches speed specification information, and causes image data to be transferred from the identified imaging apparatus to the display apparatus. The display apparatus includes: a display section; and a control section that performs a speed specification process, an image request transmission process, and a display process.

7 Claims, 15 Drawing Sheets

U.S. PATENT DOCUMENTS

| | | | |
|---|---|---|---|
| 2001/0040590 A1 | 11/2001 | Abbott et al. | |
| 2002/0054174 A1 | 5/2002 | Abbott et al. | |
| 2002/0128541 A1 | 9/2002 | Kim et al. | |
| 2003/0011684 A1* | 1/2003 | Narayanaswami et al. | 348/207.99 |
| 2003/0117505 A1 | 6/2003 | Sasaki et al. | |
| 2003/0225516 A1 | 12/2003 | Dekock et al. | |
| 2003/0235411 A1 | 12/2003 | Morikawa et al. | |
| 2004/0174443 A1* | 9/2004 | Simske | 348/231.3 |
| 2004/0267440 A1 | 12/2004 | Dekock et al. | |
| 2005/0195277 A1 | 9/2005 | Yamasaki | |
| 2005/0206583 A1 | 9/2005 | Lemelson et al. | |
| 2005/0248469 A1 | 11/2005 | Dekock et al. | |
| 2005/0248852 A1 | 11/2005 | Yamasaki | |
| 2006/0012690 A1 | 1/2006 | Nakamura et al. | |
| 2006/0074546 A1 | 4/2006 | Dekock et al. | |
| 2006/0115130 A1 | 6/2006 | Kozlay | |
| 2006/0217598 A1 | 9/2006 | Miyajima et al. | |
| 2008/0107361 A1 | 5/2008 | Asukai et al. | |
| 2008/0129839 A1 | 6/2008 | Asukai et al. | |
| 2008/0136930 A1 | 6/2008 | Nagai | |
| 2008/0253695 A1 | 10/2008 | Sano et al. | |
| 2009/0040231 A1 | 2/2009 | Sano et al. | |

FOREIGN PATENT DOCUMENTS

| | | |
|---|---|---|
| CN | 1835711 A | 9/2006 |
| EP | 1246136 A2 | 3/2002 |
| EP | 1 324 274 A2 | 7/2003 |
| EP | 1324274 A | 7/2003 |
| EP | 1503376 A2 | 2/2005 |
| EP | 1571634 A1 | 2/2005 |
| EP | 1522256 A1 | 4/2005 |
| EP | 1593964 A1 | 11/2005 |
| EP | 1656880 A | 5/2006 |
| EP | 1708150 A | 10/2006 |
| GB | 2394852 A | 5/2004 |
| GB | 2403366 A | 12/2004 |
| JP | 9-65188 A | 3/1997 |
| JP | 10-113343 A | 5/1998 |
| JP | 2002-169809 A | 6/2002 |
| JP | 2003-079591 A | 3/2003 |
| JP | 2004-049309 A | 2/2004 |
| JP | 2004-178593 A | 6/2004 |
| JP | 2004-194996 A | 7/2004 |
| JP | 2004-537193 A | 12/2004 |
| JP | 2004-538679 A | 12/2004 |
| JP | 2004-538681 A | 12/2004 |
| JP | 2005-064839 A | 3/2005 |
| JP | 2005-124909 A | 5/2005 |
| JP | 2005-141281 A | 6/2005 |
| JP | 2005-172851 A | 6/2005 |
| JP | 2005-195425 A | 7/2005 |
| JP | 2005-250977 A | 9/2005 |
| JP | 2005-260892 A | 9/2005 |
| JP | 2005-337863 A | 12/2005 |
| JP | 2005-341604 A | 12/2005 |
| JP | 2006-034803 A | 2/2006 |
| JP | 2006-080644 A | 3/2006 |
| JP | 2006-086823 A | 3/2006 |
| JP | 2006-087829 A | 4/2006 |
| JP | 2006-126891 A | 5/2006 |
| JP | 2006-146630 A | 6/2006 |
| JP | 2006-172146 A | 6/2006 |
| JP | 2007-011391 A | 1/2007 |
| JP | 2007-041964 A | 2/2007 |
| JP | 2007-081681 A | 3/2007 |
| WO | WO 99/49656 A1 | 9/1999 |
| WO | 01/43104 A1 | 6/2001 |
| WO | WO 2004/017249 A2 | 2/2004 |

* cited by examiner

FIG.10

CAMERA LOCATION/SPEED MANAGEMENT TABLE

| CAMERA ID | CURRENT LOCATION INFORMATION | CURRENT SPEED INFORMATION |
|---|---|---|
| CM001 | CP1 | CV1 |
| CM002 | CP2 | CV2 |
| CM003 | CP3 | CV3 |
| ⋮ | ⋮ | ⋮ |

IMAGE DISPLAY SYSTEM, DISPLAY APPARATUS, AND DISPLAY METHOD

CROSS REFERENCES TO RELATED APPLICATIONS

The present invention contains subject matter related to Japanese Patent Application JP 2006-330833, filed in the Japan Patent Office on Dec. 7, 2006, the entire contents of which being incorporated herein by reference.

BACKGROUND OF THE INVENTION

1. Field of the Invention

The present invention relates to an image display system, a display apparatus, and a display method. In particular, the present invention relates to a technique of displaying an image taken by an imaging apparatus placed on a movable body moving at a speed specified on the part of a display apparatus.

2. Description of the Related Art

An example of a data communication system is described in JP-A-2005-341604.

A technique of updating a relief map possessed by a car navigation system using an image taken by a camera is described in JP-A-2005-337863.

Attempts to expand programs that have been broadcast and recorded to the World Wide Web (WWW) to enjoy them are disclosed in JP-T-2004-538681, JP-T-2004-537193, and JP-T-2004-538679.

SUMMARY OF THE INVENTION

However, a technique that allows a user to specify a speed of a movable body arbitrarily to enable the user to watch an image taken at a movable body moving at the specified speed has not been proposed yet.

As such, the present invention has been devised to allow the user to specify a speed to watch an image actually taken by an imaging apparatus moving at the specified speed.

According to one embodiment of the present invention, there is provided an image display system including a display apparatus, an imaging apparatus to be placed on a movable body for taking an image, and a server apparatus. Each of the display apparatus and the imaging apparatus is capable of communicating with the server apparatus. The imaging apparatus includes: an imaging section configured to take an image to obtain image data; a speed detection section configured to detect a moving speed of the movable body and generate speed information indicative of the detected moving speed; and a control section configured to perform a transmission control process of causing the image data obtained by the imaging section and the speed information generated by the speed detection section to be transmitted to the server apparatus. The server apparatus includes: a movable body speed management section configured to manage the moving speed of the movable body on which the imaging apparatus is placed using the speed information transmitted from the imaging apparatus; and a control section configured to perform a camera identification process of, based on speed specification information transmitted from the display apparatus, checking the moving speed of the movable body managed by the movable body speed management section and identifying an imaging apparatus that matches the speed specification information, and a transfer control process of causing image data to be transferred from the identified imaging apparatus to the display apparatus. The display apparatus includes: a display section configured to perform image display; and a control section configured to perform a speed specification process of setting the speed specification information based on a user input, an image request transmission process of transmitting the speed specification information to the server apparatus to make a request for the image data, and a display process of receiving the image data transmitted from the server apparatus in response to the image request transmission process and causing the display section to perform a display operation based on the received image data.

According to another embodiment of the present invention, there is provided an image display system including a display apparatus, an imaging apparatus to be placed on a movable body for taking an image, and a server apparatus. Each of the display apparatus and the imaging apparatus is capable of communicating with the server apparatus. The imaging apparatus includes: an imaging section configured to take an image to obtain image data; a speed detection section configured to detect a moving speed of the movable body and generate speed information indicative of the detected moving speed; and a control section configured to perform a transmission control process of causing the image data obtained by the imaging section and additional data that includes at least the speed information generated by the speed detection section when the image data was obtained by taking an image to be transmitted to the server apparatus. The server apparatus includes: a storage section configured to store the image data and the additional data transmitted from the imaging apparatus; and a control section configured to perform a search/transmission control process of searching through the image data stored in the storage section based on speed specification information transmitted from the display apparatus, and causing image data found to be read from the storage section and transmitted to the display apparatus. The display apparatus includes: a display section configured to perform image display; and a control section configured to perform a speed specification process of setting the speed specification information based on a user input, an image request transmission process of transmitting the speed specification information to the server apparatus to make a request for the image data, and a display process of receiving the image data transmitted from the server apparatus in response to the image request transmission process and causing the display section to perform a display operation based on the received image data.

According to yet another embodiment of the present invention, there is provided a display apparatus including: a display section configured to perform image display; a communication section configured to perform data communication with an external server apparatus; and a control section configured to perform a speed specification process of setting speed specification information based on a user input, an image request transmission process of transmitting the speed specification information to the server apparatus via the communication section to make a request for image data, and a display process of causing the communication section to receive the image data transmitted from the server apparatus in response to the image request transmission process and causing the display section to perform a display operation based on the received image data.

According to yet another embodiment of the present invention, there is provided a display method including the steps of: setting speed specification information based on a user input; transmitting the speed specification information to an external server apparatus to make a request for image data; and receiving the image data transmitted from the server apparatus in response to the request, and performing display based on the received image data.

In accordance with the present invention, by specifying a speed, a user of the display apparatus is able to see an image actually taken by an imaging apparatus placed on a movable body moving at the specified speed. Examples of such external imaging apparatuses include: an imaging apparatus worn by another person; an imaging apparatus attached to an automobile, a train, or the like; an imaging apparatus placed on an animal, a bird, or the like.

Examples of system operations include: an operation in which taken image data is transferred in real time from the imaging apparatus to the display apparatus through the server apparatus; and an operation in which the image data taken in the imaging apparatus is stored in the server apparatus, and the image data stored therein is read and supplied to the display apparatus.

In the case of real-time transfer, the server apparatus uses the movable body speed management section to recognize the moving speed of each movable body. Thus, when the speed specification information is received from the display apparatus, the server apparatus is able to identify an imaging apparatus that matches the speed specification information. The server apparatus causes image data to be transferred from the identified imaging apparatus to the display apparatus. The display apparatus receives and displays the image data. As a result, the user of the display apparatus can see a displayed image of a current scene taken by the imaging apparatus moving at a speed corresponding to the specified speed.

In the case where the image data is stored in the server apparatus, the image data obtained by taking an image by the imaging apparatus placed on the movable body is transmitted to the server apparatus together with the additional data including the speed information indicative of the moving speed at the time of image taking, and the image data and the additional data are stored in the server apparatus. Accordingly, image data of images taken by a large number of imaging apparatuses at a variety of places is accumulated in the server apparatus together with the speed information thereof. Thus, if a speed is specified on the part of the display apparatus and the speed specification information indicative of the specified speed is transmitted to the server apparatus, the server apparatus is able to search through the image data stored therein based on the speed specification information. The server apparatus retrieves image data that matches the speed specification information, and transmits the retrieved image data to the display apparatus. The display apparatus receives and displays the image data. As a result, the user of the display apparatus can see a displayed image of a past scene taken by an imaging apparatus moving at the specified speed.

According to the present invention, by specifying a speed, the user of the display apparatus can see an image taken by an imaging apparatus that is (or was) moving at the specified speed. Thus, the present invention allows the user to experience scenes that could be seen from movable bodies moving at a variety of speeds.

Further, because the user is able to specify a location as well using a map image, for example, the user can see a scene that could be seen while moving at a certain location at a certain speed. This is preferable when there is a desire to check a scene that could be seen when moving at a certain place that can be specified at a certain speed, or when there is a desire to enjoy seeing such a scene.

Still further, because the user is able to specify a date/time as well, the user can see a scene that could be seen when moving at a certain speed at a certain date/time. Thus, it is possible to provide a variety of scenes to the user.

BRIEF DESCRIPTION OF THE DRAWINGS

FIG. 10 is a diagram illustrating a camera location/speed management table according to one embodiment of the present invention;

DETAILED DESCRIPTION OF THE PREFERRED EMBODIMENTS

Hereinafter, an image display system, a display apparatus, and a display method according to preferred embodiments of the present invention will be described. An imaging/display apparatus 1 and a display apparatus 40 according to the preferred embodiments correspond to a display apparatus as recited in the appended claims, and in the preferred embodiments, a display method according to the present invention is performed as a procedure of the imaging/display apparatus 1 or the display apparatus 40. Meanwhile, the imaging/display apparatus 1 and an imaging apparatus 30 according to the preferred embodiments correspond to an imaging apparatus as recited in the appended claims. Therefore, the imaging/display apparatus 1 according to the preferred embodiments is able to function as both the display apparatus and the imaging apparatus as recited in the appended claims.

The following description follows the following order.

[1. Exemplary appearances of imaging/display apparatus, imaging apparatus, and display apparatus]

[2. System configuration]

[3. Exemplary structures of imaging/display apparatus, imaging apparatus, display apparatus, and server apparatus]

[4. Exemplary system operation I]

[5. Exemplary system operation II]

[6. Effects of embodiments, exemplary variants, and exemplary expansions]

[1. Exemplary Appearances of Imaging/Display Apparatus, Imaging Apparatus, and Display Apparatus]

Figure 1:
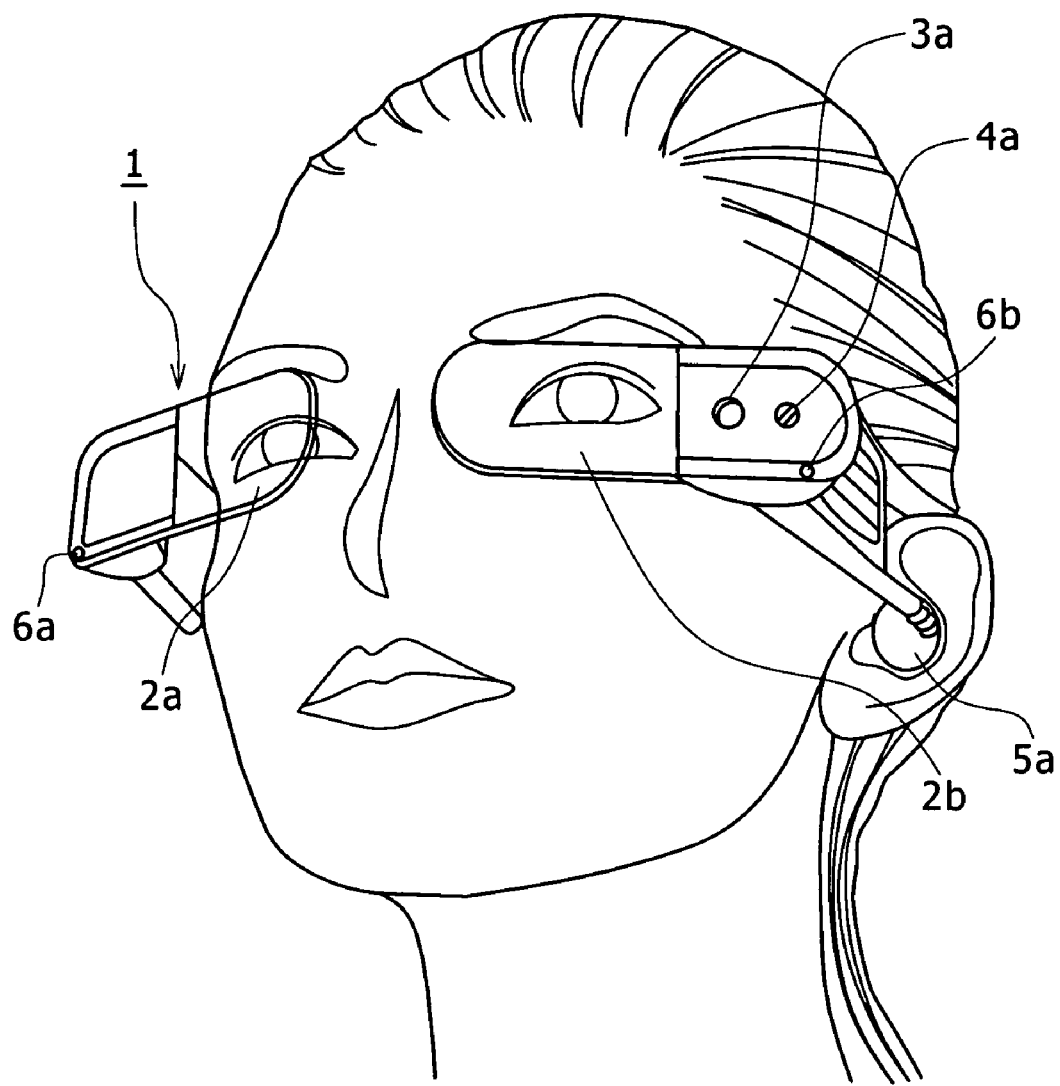
FIG. 1 is an illustration showing an exemplary appearance of an imaging/display apparatus according to one embodiment of the present invention.

FIG. 1 illustrates an exemplary appearance of the imaging/display apparatus 1. This imaging/display apparatus 1 can be worn by a user as a spectacle-shaped display camera.

The imaging/display apparatus 1 has a wearing unit having a frame structure that extends halfway around a head from both temporal regions to an occipital region, for example, and is worn by the user with the wearing unit placed over ears as illustrated in this figure.

The imaging/display apparatus 1 has a pair of display panel sections 2a and 2b designed for left and right eyes, and the display panel sections 2a and 2b are arranged in front of the eyes of the user (i.e., at positions where lenses of common spectacles would be located) when the imaging/display apparatus 1 is worn by the user in a manner as illustrated in FIG. 1. Liquid crystal panels, for example, are used for the display panel sections 2a and 2b, and the display panel sections 2a and 2b are capable of entering a see-through state, i.e., a transparent or translucent state, as illustrated in this figure by transmittance control. The capability of the display panel sections 2a and 2b to enter the see-through state allows the user to wear the imaging/display apparatus 1 at all times as he or she wears spectacles, with no interference occurring in his or her daily life.

In addition, the imaging/display apparatus 1 has an image-pickup lens 3a arranged to face forward so as to image a scene that is in a direction in which the user sees while the imaging/display apparatus 1 is worn by the user.

In addition, the imaging/display apparatus 1 has a lighting section 4a that provides illumination in a direction in which the image-pickup lens 3a takes an image. The lighting section 4a is formed by a light emitting diode (LED), for example.

In addition, the imaging/display apparatus 1 has a pair of earphone speakers 5a that can be inserted into right and left earholes of the user when the imaging/display apparatus 1 is worn by the user. Note that only the left earphone speaker 5a is shown in the figure.

In addition, the imaging/display apparatus 1 has microphones 6a and 6b for collecting external sounds. The microphones 6a and 6b are arranged to the right of the right display panel section 2a and to the left of the left display panel section 2b, respectively.

Note that FIG. 1 only shows one example, and that various structures are possible for the user to wear the imaging/display apparatus 1. In general, a requirement for the wearing unit is that it be in the shape of spectacles or of a head-worn type so that the display panel sections 2a and 2b are arranged in front of and close to the eyes of the user, for example, and that the direction in which the image-pickup lens 3a takes an image is a direction in which the eyes of the user are directed, i.e., in a forward direction. Also note that although the pair of display panel sections 2a and 2b may be provided for the both eyes as described above, only one display section may be provided for one of the eyes.

Also note that the direction in which the image-pickup lens 3a takes an image need not coincide with the direction in which the eyes of the user are directed. For example, the image-pickup lens 3a may image sideways or rearward.

Also note that the imaging/display apparatus 1 need not have the left and right stereo speakers 5a, but may have only one of the earphone speakers 5a to be inserted into one of the earholes. Also note that the number of microphones may be one. That is, the imaging/display apparatus 1 may have only one of the microphones 6a and 6b. Also note that the imaging/display apparatus 1 need not have any microphone or earphone speaker.

Also note that the imaging/display apparatus 1 need not have any lighting section 4a.

Although the wearing unit of the imaging/display apparatus 1 has been described as being in the shape of spectacles or of the head-mounted type, the wearing unit used for the user to wear the imaging/display apparatus may be of any type, such as a headphone type, a neckband type, a behind-the-ear type, or the like. Further, the imaging/display apparatus may be attached to common spectacles, visor, headphone, or the like via a fixing device, such as a clip, so that the imaging/display apparatus can be worn by the user. Also note that it is not necessary that the imaging/display apparatus be worn on the head of the user.

The imaging/display apparatus 1 illustrated in FIG. 1 is a device that is to be worn by the user and in which a component for imaging and the display panel sections 2a and 2b for monitoring an image are integrated in one unit. However, there are other examples of devices to be worn by the user, such as the imaging apparatus 30 illustrated in FIG. 2A and the display apparatus 40 illustrated in FIG. 2B.

Figure 2A:
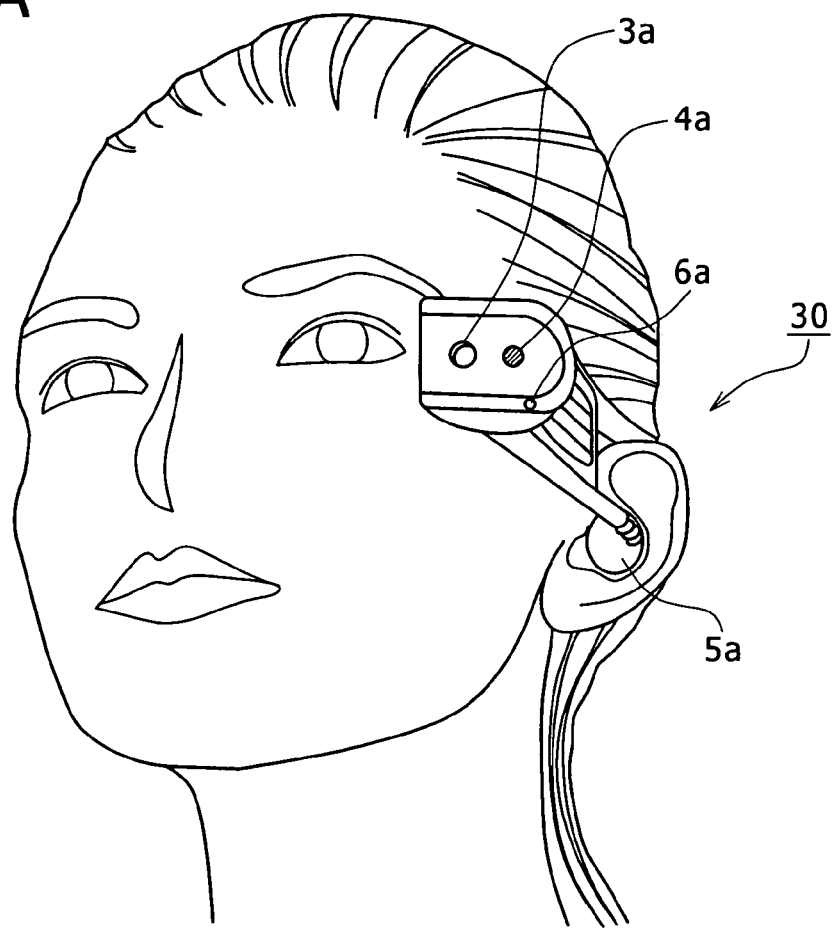
FIGS. 2A and 2B are illustrations showing exemplary appearances of an imaging apparatus and a display apparatus according to one embodiment of the present invention.

The imaging apparatus 30 illustrated in FIG. 2A is worn on one of the temporal regions of the user using a predetermined wearing frame. The imaging apparatus 30 has the image-pickup lens 3a and the lighting section 4a, which are arranged to face forward so as to image a scene that is in the direction in which the user sees while the imaging apparatus 30 is worn by the user. In addition, the imaging apparatus 30 has the microphone 6a for collecting the external sounds.

That is, the imaging apparatus 30 is a device that does not have a display capability but has a capability to image a scene within the user's field of vision while it is worn by the user. As is also the case with the imaging/display apparatus 1 described above, the imaging apparatus 30 can have a variety of shapes, structures for wearing, and components.

Figure 2B:
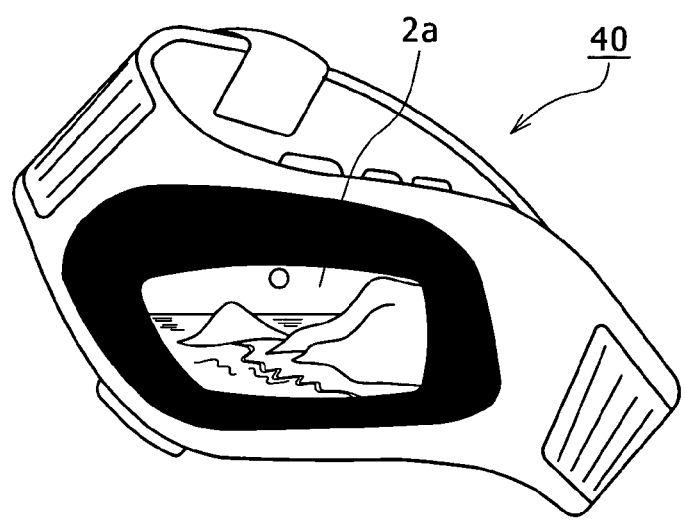

The display apparatus 40 illustrated in FIG. 2B is a display apparatus in the shape of a wristwatch. The display apparatus 40 has the display panel section 2a which the user can see while the display apparatus 40 is worn on a wrist of the user using a wristband.

While the display apparatus 40 illustrated in FIG. 2B assumes the shape of the wristwatch, the display apparatus 40 to be worn or carried by the user can have a variety of shapes and structures for wearing or carrying. The display apparatus 40 may be a small portable device that can be carried by the user, for example. Also, the display apparatus 40 may be a spectacle-shaped device to be worn by the user (i.e., a device that is similar to the imaging/display apparatus 1 illustrated in FIG. 1 except that this device does not have an imaging capability).

While the display apparatus 40 to be carried by the user may be a device dedicated to displaying for monitoring, other types of devices having the display capability, such as a mobile phone, a portable game machine, and a personal digital assistant (PDA), also can function as the display apparatus 40 according to the present embodiment.

Also, besides such devices as can be worn or carried by the user, a stationary display apparatus, a computer apparatus, a television receiver, a in-vehicle display monitor, and so on can also be adopted as the display apparatus 40 according to the present embodiment.

While the imaging apparatus 30 illustrated in FIG. 2A and the display apparatus 40 illustrated in FIG. 2B may be used independently of each other, both of the imaging apparatus 30 and the display apparatus 40 may be worn by the user and used in combination as the imaging/display apparatus. In that case, the imaging apparatus 30 and the display apparatus 40 may perform data communication with each other so that the display apparatus 40 displays an image taken by the imaging apparatus 30 for monitoring or displays an image transmitted from an external device, for example.

It is assumed in the present embodiment that the imaging/display apparatus 1 and the display apparatus 40 are used by human users, and that the imaging apparatus 30 is placed on a variety of movable bodies including people and used thereat. Although the imaging apparatus 30 as illustrated in FIG. 2A is supposed to be worn by a person to image a scene within that person's field of vision, there are a variety of other imaging apparatuses 30 that are placed on movable bodies other than people.

Examples of the movable bodies other than people include non-human creatures, devices that travel on the ground, devices that travel on a sea surface, devices that travel beneath the sea surface, devices that travel through the air, and devices that travel outside the atmosphere of the earth.

Examples of the non-human creatures include birds, mammals, reptiles, amphibians, fish, insects, and a variety of other creatures.

Examples of the devices that travel on the ground include automotive vehicles, such as cars, trucks, buses, taxis, and motorcycles, and human-powered vehicles, such as bicycles, rickshaw, and toy vehicles. Other examples include railway vehicles such as trains and steam locomotives. Still other examples include rides at an amusement park or the like, and business-use vehicles used in a factory or other facilities. The devices that travel on the ground are not limited to movable bodies on which people ride. For example, various types of robots designed for business or entertainment use and toys such as radio-controlled toys are also examples of the devices that travel on the ground.

Examples of the devices that travel on the sea surface include a variety of watercrafts such as ships, boats, personal watercrafts, surfboards, rowboats, inflatable rings, and rafts.

Examples of the devices that travel beneath the sea surface include submarines, autonomous underwater vehicles, and diving equipment such as aqualungs.

Examples of the devices that travel through the air include a variety of aircrafts such as airplanes, helicopters, gliders, parachutes, balloons, and kites.

Examples of the devices that travel outside the atmosphere of the earth include rockets, space probes, and satellites.

It will be appreciated that there are a variety of other specific examples of movable bodies. The shape and structure for placing of the imaging apparatus 1 depends on the movable body on which the imaging apparatus 1 is placed.

[2. System Configuration]

In the present embodiment, the user of the imaging/display apparatus 1 or the display apparatus 40 specifies a speed to watch a current or past image taken by another imaging/display apparatus 1 or the imaging apparatus 30 moving at the specified speed. An exemplary system configuration for achieving this operation is illustrated in FIG. 3.

Figure 3:
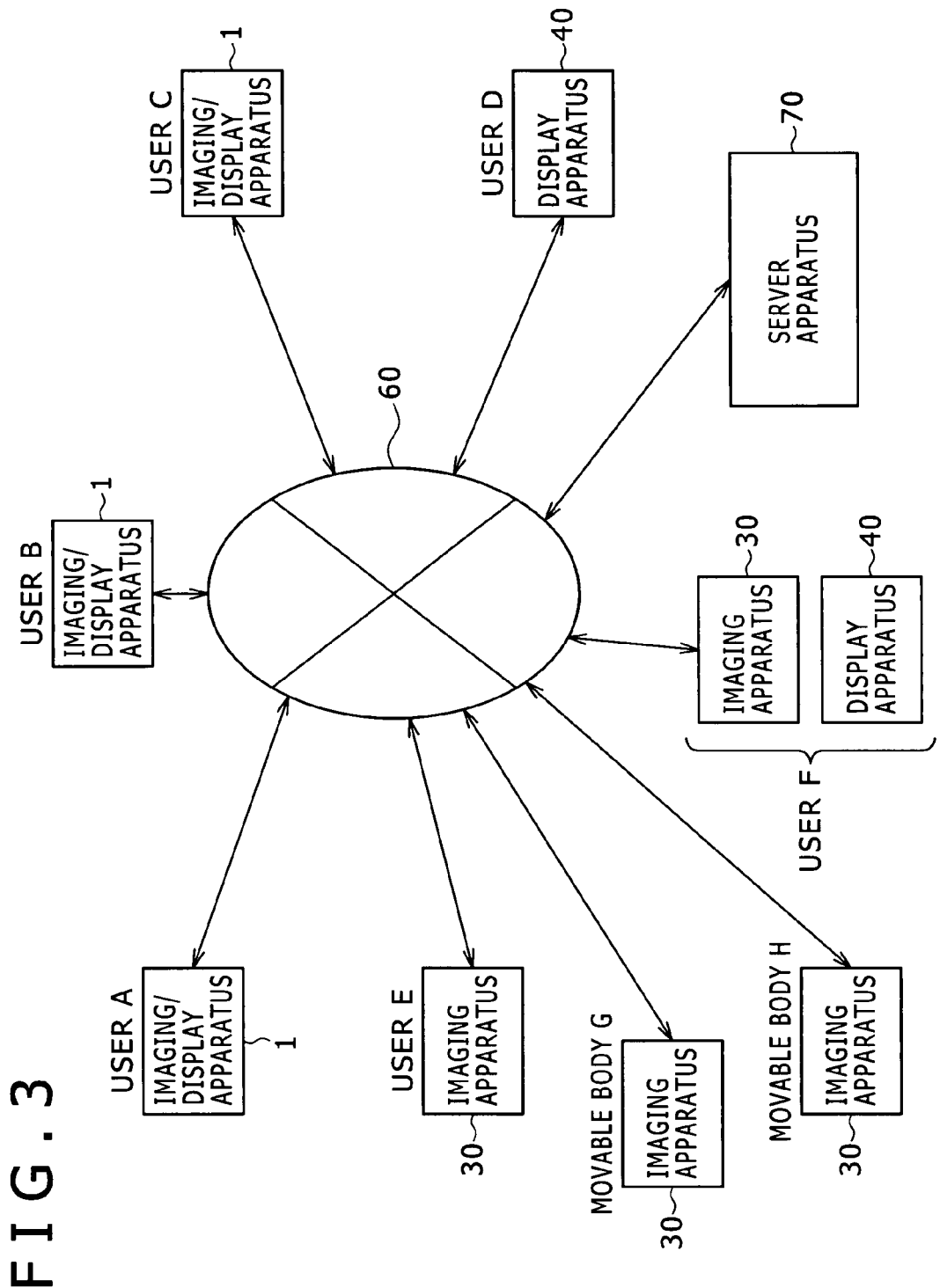
FIG. 3 is a diagram illustrating an exemplary system configuration according to one embodiment of the present invention.

FIG. 3 illustrates a configuration of a system in which the imaging/display apparatuses 1, the display apparatuses 40, the imaging apparatuses 30, and a server apparatus 70 communicate with one another via a network 60.

Examples of the network 60 include wide-area networks, such as the Internet, and small-area networks, such as a local area network (LAN).

It is assumed here that users A, B, and C are wearing the imaging/display apparatus 1 as illustrated in FIG. 1, for example. It is also assumed here that user D is wearing the display apparatus 40 as illustrated in FIG. 2B, for example, and that user E is wearing the imaging apparatus 30 as illustrated in FIG. 2A.

It is further assumed that user F is wearing both the imaging apparatus 30 as illustrated in FIG. 2A and the display apparatus 40 as illustrated in FIG. 2B, which combine to function as the imaging/display apparatus.

It is also assumed that the imaging apparatuses 30 mounted on movable bodies G and H are imaging apparatuses that are mounted on a movable body (a movable body other than a person), such as an automobile, a railway vehicle, or an aircraft, and have a suitable form to be placed thereon.

Two examples of system operations (i.e., exemplary system operations I and II) will be described below. First, in the case of exemplary system operation I, the imaging apparatus 30 worn by user E and the imaging apparatuses 30 mounted on movable bodies G and H transmit, regularly or at a predetermined time such as when their moving speed has changed, speed information indicative of their moving speed to the server apparatus 70 via the network 60 together with a camera ID (i.e., identification information of each of the imaging apparatuses 30), for example.

The imaging/display apparatus 1 worn by each of users A, B, and C also transmits, constantly, regularly, or at a predetermined time, the camera ID and the speed information thereof to the server apparatus 70 via the network 60.

The server apparatus 70 manages the speed information transmitted from each of the imaging apparatuses 30 and the imaging/display apparatuses 1 together with their camera IDs in order to recognize, at all times, a current moving speed of each of the imaging apparatuses 30 and the imaging/display apparatuses 1.

Meanwhile, in response to the user's specifying a speed, each of the imaging/display apparatuses 1 worn by users A, B, and C and the display apparatuses 40 worn by users D and F accesses the server apparatus 70 via the network 60 and transmits speed specification information indicative of the specified speed to the server apparatus 70 to make a request for an image.

Based on the speed specification information, the server apparatus 70 identifies an imaging apparatus 30 or imaging/display apparatus 1 that is moving at a speed that matches the speed specification information. Then, the server apparatus 70 requests the identified imaging apparatus 30 or imaging/display apparatus 1 to transmit image data of an image being taken thereby. After the identified imaging apparatus 30 or imaging/display apparatus 1 starts transmitting the image data in response to the request, the server apparatus 70 forwards the image data to the display apparatus 40 or imaging/display apparatus 1 at which the speed was specified.

The imaging/display apparatus 1 or display apparatus 40 at which the speed was specified receives the image data transmitted from the server apparatus 70, and displays the received image data.

In the above-described manner, users A, B, C, D, and F are able to watch, by specifying a speed, a scene that is actually being taken by an imaging apparatus or imaging/display apparatus moving at the specified speed.

Note that exemplary system operation I will be described below on the assumption that the user of the imaging/display apparatus 1 or the display apparatus 40 specifies not only the speed but also a location.

Next, in the case of exemplary system operation II, each of the imaging apparatus 30 worn by user E and the imaging apparatuses 30 mounted on movable bodies G and H uploads, constantly, regularly, or at an arbitrary time, image data obtained by taking an image and additional data that includes at least the speed information indicative of the speed at the time of taking an image to the server apparatus 70 via the network 60.

Each of the imaging/display apparatuses 1 worn by users A, B, and C is also capable of uploading, constantly, regularly, or at an arbitrary time, the image data obtained by taking an image and the additional data that includes at least the speed information indicative of the speed at the time of imaging to the server apparatus 70 via the network 60.

The server apparatus 70 registers and stores the image data and the additional data uploaded by each of the imaging/display apparatuses 1 and the imaging apparatuses 30 in a speed image database, which will be described below.

Meanwhile, in response to the user's specifying a speed, each of the imaging/display apparatuses 1 worn by users A, B, and C and the display apparatuses 40 used by users D and F accesses the server apparatus 70 via the network 60 and transmits the speed specification information indicative of the specified speed to the server apparatus 70 to make a request for an image.

Based on the speed specification information, the server apparatus 70 searches the speed image database to extract image data of an image taken by an imaging apparatus or imaging/display apparatus that was moving at the specified speed indicated by the speed specification information. Then, the server apparatus 70 transmits the extracted image data to the imaging/display apparatus 1 or the display apparatus 40.

The imaging/display apparatus 1 or the display apparatus 40 receives the image data transmitted from the server apparatus 70, and displays the received image data.

In the above-described manner, users A, B, C, D, and F are able to watch a scene that was actually taken in the past by an imaging apparatus or imaging/display apparatus moving at the specified speed.

Note that exemplary system operation II will be described below on the assumption that the user of the imaging/display apparatus 1 or the display apparatus 40 specifies not only the speed but also the location.

[3. Exemplary Structures of Imaging/Display Apparatus, Imaging Apparatus, Display Apparatus, and Server Apparatus]

Exemplary structures of the imaging/display apparatus 1, the imaging apparatus 30, the display apparatus 40, and the server apparatus 70 will now be described below with reference to FIGS. 4 to 8.

First, the exemplary structure of the imaging/display apparatus 1 will be described below with reference to FIG. 4.

A system controller 10 is formed by a microcomputer that includes a central processing unit (CPU), a read only memory (ROM), a random access memory (RAM), a nonvolatile memory section, and an interface section, for example, and controls an overall operation of the imaging/display apparatus 1. Based on a program held in the internal ROM or the like, the system controller 10 performs a variety of computational processes and exchanges a control signal and so on with each part of the imaging/display apparatus 1 via a bus 13 to cause each part of the imaging/display apparatus 1 to perform a necessary operation.

The imaging/display apparatus 1 includes an imaging section 3 as a component for imaging the scene that is in the direction in which the user sees.

The imaging section 3 includes an imaging optical system, an imaging device section, and an imaging signal processing section.

The imaging optical system in the imaging section 3 is provided with: a lens system formed by the image-pickup lens 3a illustrated in FIG. 1, a diaphragm, a zoom lens, a focus lens, and the like; a driving system for allowing the lens system to perform a focusing operation, a zoom operation; and the like.

The imaging device section in the imaging section 3 is provided with a solid-state imaging device array for detecting light for imaging obtained by the imaging optical system, and subjecting the detected light to optical-to-electrical conversion to generate an imaging signal. The solid-state imaging device array is, for example, a charge coupled device (CCD) sensor array or a complementary metal oxide semiconductor (CMOS) sensor array.

The imaging signal processing section in the imaging section 3 includes a sample-hold/automatic gain control (AGC) circuit for subjecting the signal obtained by the solid-state imaging device to gain control and waveform shaping, and a video A/D converter, and obtains picked-up image data in digital form. The imaging signal processing section also performs white balancing processing, brightness processing, color signal processing, blur correction processing, and the like on the picked-up image data.

Imaging is performed by the imaging section 3 that includes the imaging optical system, the imaging device section, and the imaging signal processing section described above, so that the image data is obtained by imaging.

The system controller 10 performs control of turning on and off of an imaging operation in the imaging section 3, drive control of the zoom lens and the focus lens in the imaging optical system, control of sensitivity and a frame rate in the imaging device section, setting of a parameter for each process and setting for a process performed in the imaging signal processing section, and so on.

The picked-up image data obtained by the imaging operation performed by the imaging section 3 can be supplied to a display section 2, a storage section 25, or a communication section 26 via an image processing section 15.

Under control of the system controller 10, the image processing section 15 performs a process of converting the picked-up image data into a predetermined image data format, and necessary signal processing for allowing the image data to be displayed on the display section 2 for monitoring. Examples of the signal processing for allowing the image data to be displayed on the display section 2 for monitoring include: brightness level control; color correction; contrast control; sharpness (edge enhancement) control; a split screen process; a process of synthesizing a character image; generation of a magnified or reduced image; and application of image effects, such as a mosaic image, a brightness-reversed image, soft focus, highlighting of a part of the image, and varying of an overall color atmosphere of the image.

The image processing section 15 also performs a process of transferring the image data among the imaging section 3, the display section 2, the storage section 25, and the communication section 26. Specifically, the image processing section 15 performs a process of supplying the picked-up image data from the imaging section 3 to the display section 2, the storage section 25, or the communication section 26, a process of supplying image data read from the storage section 25 to the display section 2, and a process of supplying image data received by the communication section 26 to the display section 2.

The imaging/display apparatus 1 includes the display section 2 as a component for presenting a display to the user. The display section 2 is provided with the above-described display panel sections 2a and 2b formed by the liquid crystal panels, and a display driving section for driving the display panel sections 2a and 2b to display.

The display driving section is formed by a pixel driving circuit for allowing an image signal supplied from the image processing section 15 to be displayed on the display panel sections 2a and 2b, which are formed as liquid crystal displays, for example. That is, the display driving section applies driving signals based on a video signal to pixels arranged in a matrix in the display panel sections 2a and 2b with predetermined horizontal/vertical driving timing for displaying. As a result of this process, an image taken by the imaging section 3, an image of the image data read from the storage section 25, or an image of the image data received by the communication section 26 is displayed on the display panel sections 2a and 2b.

In addition, the display driving section is capable of controlling transmittance of each of the pixels in the display panel sections 2a and 2b to allow the pixel to enter the see-through state (i.e., the transparent or translucent state).

The system controller 10 performs on/off (see-through) control of a display operation in the display section 2, specification of a process parameter related to the image data to be displayed, screen area setting control, instruction for generation of a character, and so on.

The imaging/display apparatus 1 further includes an audio input section 6, an audio processing section 16, and an audio output section 5.

The audio input section 6 includes the microphones 6a and 6b illustrated in FIG. 1, a microphone amplifier section for amplifying audio signals obtained by the microphones 6a and 6b, and an A/D converter, and outputs audio data.

The audio data obtained at the audio input section 6 is supplied to the audio processing section 16.

Under control of the system controller 10, the audio processing section 16 controls transfer of the audio data. Specifically, the audio processing section 16 supplies the audio data obtained at the audio input section 6 to the audio output section 5, the storage section 25, or the communication section 26. The audio processing section 16 also supplies audio data read from the storage section 25 or audio data received by the communication section 26 to the audio output section 5.

Under control of the system controller 10, the audio processing section 16 also performs a process such as volume control, tone control, or application of a sound effect.

The audio output section 5 includes the pair of earphone speakers 5a illustrated in FIG. 1, an amplifier circuit for the earphone speakers 5a, and a D/A converter.

That is, the audio data supplied from the audio processing section 16 is converted by the D/A converter into an analog audio signal, and the analog audio signal is amplified by the amplifier circuit and outputted via the earphone speaker 5a as sound. Thus, the user is able to listen to the external sound, audio based on the audio data read from the storage section 25, or audio based on the audio data received by the communication section 26.

Note that the audio output section 5 may use a so-called bone conduction speaker.

The storage section 25 is a unit for recording and reading the image data (and the audio data) onto or from a predetermined storage medium. For example, the storage section 25 is formed by a hard disk drive (HDD). Needless to say, as the storage medium, various types of storage media are adoptable, such as a solid-state memory like a flash memory, a memory card containing the solid-state memory, an optical disk, a magneto-optical disk, and a hologram memory. A requirement for the storage section 25 is to be capable of recording and reading in accordance with the adopted storage medium.

Under control of the system controller 10, the storage section 25 records the image data (and the audio data) obtained by imaging on the storage medium, or records the image data (and the audio data) received by the communication section 26 on the storage medium. Specifically, the storage section 25 encodes the image data supplied via the image processing section 15 and the audio data supplied via the audio processing section 16, or the image data and the audio data received by the communication section 26, so that they can be recorded on the storage medium, and then records the encoded data on the storage medium.

In addition, under control of the system controller 10, the storage section 25 is also capable of reading the recorded image data and audio data. The read image data is supplied to the display section 2 via the image processing section 15, whereas the read audio data is supplied to the audio output section 5 via the audio processing section 16. It is also possible to supply the read image/audio data to the communication section 26 as data to be transmitted to the external device.

The communication section 26 transmits and receives data to or from the external device, particularly the server apparatus 70, via the network 60 illustrated in FIG. 3.

The communication section 26 may be configured to perform network communication via short-range wireless communication for a network access point, for example, in accordance with a system such as a wireless LAN, Bluetooth, or the like.

The picked-up image data obtained by the imaging section 3 is supplied to the communication section 26 via the image processing section 15. Also, the audio data obtained by the audio input section 6 is supplied to the communication section 26 via the audio processing section 16. The communication section 26 is capable of encoding the image data and the audio data for the purpose of communication, modulating the encoded data for radio transmission, and transmitting the modulated data to the external device. That is, the communication section 26 is capable of transmitting the image data and the audio data currently obtained in the imaging/display apparatus 1 by imaging and sound collecting to the external device (e.g., the server apparatus 70).

In addition, the communication section 26 is also capable of encoding the image data and the audio data read from the storage section 25 for the purpose of communication, modulating the encoded data for radio transmission, and transmitting the modulated data to the external device.

In exemplary system operation I described below, the system controller 10 performs, in addition to the transmission of the image/audio data, a process of transmitting, constantly, regularly, or at a predetermined time, current speed information detected by a speed detection section 17 described below and current location information detected by a location detection section 12 to the server apparatus 70 via the communication section 26 together with the camera ID. The camera ID is identification information uniquely assigned to each device, and is a code that can be used to identify, on the system, a specific imaging/display apparatus 1 or imaging apparatus 30. The camera ID may be stored in a nonvolatile memory or the like within the system controller 10, for example.

The transmission of the image/audio data is performed when a request for an image is received from the server apparatus 70.

In exemplary system operation II described below, at the time when the image/audio data currently obtained in the imaging/display apparatus 1 by imaging and sound collecting is transmitted to the server apparatus 70, for example, the system controller 10 generates the additional data, and causes the communication section 26 to encode and transmit the additional data together with the image/audio data. The additional data includes management information of the image data, the current speed information detected by the speed detection section 17 described below, the current location information detected by the location detection section 12, and current date/time information obtained by calculation by a date/time calculation section 28.

Another possible operation is an operation of once storing the image/audio data obtained by imaging and sound collecting in the storage section 25, then reading the stored image/audio data from the storage section 25 at a subsequent time, and transmitting the read image/audio data to the server apparatus 70 via the communication section 26. In the case of this operation, the system controller 10, when storing the image/audio data in the storage section 25, generates the additional data including the pieces of information mentioned above, and causes the storage section 25 to record the additional data together with the image/audio data. When the recorded image/audio data is read from the storage section 25 and transmitted to the server apparatus 70, the additional data recorded together is also transmitted to the server apparatus 70.

When the system controller 10 transmits the image/audio data to the server apparatus 70 by performing the above process, location information indicative of a location at which the image data was obtained by taking an image and date/time information indicative of a date and time when the image/audio data was obtained are also transmitted to the server apparatus 70.

In addition, the communication section 26 receives the image/audio data transmitted from the external device (the server apparatus 70), demodulates the received image/audio data, and supplies the demodulated image/audio data to the image processing section 15 and the audio processing section 16. In this case, the received image and audio are outputted via the display section 2 and the audio output section 5, respectively.

Needless to say, the image/audio data received by the communication section 26 may be supplied to the storage section 25 and recorded on the storage medium.

The imaging/display apparatus 1 further includes an illumination section 4 and an illumination control section 14. The illumination section 4 is formed by the lighting section 4a illustrated in FIG. 1 and a lighting circuit for causing the lighting section 4a (e.g., the LED) to emit light. Based on an instruction issued from the system controller 10, the illumination control section 14 causes the illumination section 4 to perform a lighting operation.

Because the lighting section 4a in the illumination section 4 is attached to the imaging/display apparatus 1 in the manner illustrated in FIG. 1, the illumination section 4 provides illumination in the direction in which the image-pickup lens 3a takes an image.

The imaging/display apparatus 1 further includes an operation input section 11 for user operation.

The operation input section 11 may include an operation unit(s) such as a key, a dial, or the like, and be configured to detect a user operation such as a key operation. Alternatively, the operation input section 11 may be configured to detect a deliberate behavior of the user.

In the case where the operation input section 11 includes the operation unit(s), the operation unit(s) may include operation units for a power on/off operation, imaging-related operations (e.g., the zoom operation, an operation related to signal processing, etc.), display-related operations (e.g., selection of a display content, an operation for controlling the display, etc.), and an operation for specifying the external device described below.

In the case where the operation input section 11 is configured to detect a user behavior, the operation input section 11 may be provided with an acceleration sensor, an angular velocity sensor, a vibration sensor, a pressure sensor, or the like.

For example, the user's act of tapping the imaging/display apparatus 1 from the side may be detected with the acceleration sensor, the vibration sensor, or the like. Thus, the system controller 10 may determine that a user operation has occurred when lateral acceleration has exceeded a predetermined value, for example. Moreover, the acceleration sensor, the angular velocity sensor, or the like may be used to detect whether the user has tapped the side (which corresponds to a sidepiece of spectacles) of the imaging/display apparatus 1 from the right side or from the left side, and the system controller 10 may regard each of these acts of the user as a predetermined operation.

Further, the user's act of turning or shaking his or her head may be detected with the acceleration sensor, the angular velocity sensor, or the like. The system controller 10 may regard each of these acts of the user as a user operation.

Still further, the pressure sensor may be provided on each of the left and right sides (which correspond to the sidepieces of the spectacles) of the imaging/display apparatus 1, for example. Then, the system controller 10 may determine that the user has performed an operation for telephoto zooming when the user has pushed the right side of the imaging/display apparatus 1 with a finger, and determine that the user has performed an operation for wide-angle zooming when the user has pushed the left side of the imaging/display apparatus 1 with a finger.

Still further, the operation input section 11 may be provided with a biological sensor used to detect biological information concerning the user. In this case, the biological information detected may be recognized as an operation input. Examples of the biological information include a pulse rate, a heart rate, electrocardiogram information, electromyographic information, breathing information (e.g., a rate of breathing, a depth of breathing, the amount of ventilation, etc.), perspiration, galvanic skin response (GSR), blood pressure, a saturation oxygen concentration in the blood, a skin surface temperature, brain waves (e.g., information of alpha waves, beta waves, theta waves, and delta waves), a blood flow change, and the state of the eyes.

Then, the system controller 10 may recognize the information detected by the biological sensor as an operation input by the user. One example of deliberate behaviors of the user is a motion of the eyes (e.g., a change in the direction in which the eyes of the user are directed, winking, etc.). For example, when the user's act of winking three times has been detected, the system controller 10 may regard this act as a specific operation input. Further, it is also possible to detect, based on the biological information detected, that the user has put on or taken off the imaging/display apparatus 1, or that a specific user has put on the imaging/display apparatus 1, for example. Thus, the system controller 10 may turn on or off power of the imaging/display apparatus 1 in response to detection of such an act, for example.

The operation input section 11 supplies, to the system controller 10, information acquired by functioning as the operation unit(s), the acceleration sensor, the angular velocity sensor, the vibration sensor, the pressure sensor, the biological sensor, or the like as described above. The system controller 10 detects the user operation based on the supplied information.

The imaging/display apparatus 1 further includes the speed detection section 17. The speed detection section 17 detects a moving speed (i.e., a speed at which the user walks or travels) of the user who is wearing the imaging/display apparatus 1. Needless to say, while the user stays still, the moving speed of the user is zero. The speed detection section 17 may detect the moving speed of the user by using the acceleration sensor or the like. Alternatively, the speed detection section 17 may calculate the moving speed of the user by analyzing an image of surroundings taken by the imaging section 3.

The imaging/display apparatus 1 further includes the location detection section 12. The location detection section 12 is, for example, a GPS receiver section. The GPS receiver section receives a radio wave from a global positioning system (GPS) satellite, and outputs information of a latitude and longitude of a current location to the system controller 10.

Note that the location detection section 12 may employ Wi-Fi (Wireless Fidelity) or a location information service provided by a mobile phone company, or a combination of such a service and the GPS.

The current location detected may be corrected using the speed detected by the speed detection section 17.

The imaging/display apparatus 1 further includes the date/time calculation section 28. The date/time calculation section 28 calculates a current date and time (year, month, day, hour, minute, second). The system controller 10 is capable of recognizing the current date and time based on a value calculated by the date/time calculation section 28.

In the case of exemplary system operation I, the moving speed detected by the speed detection section 17 and the current location information detected by the location detection section 12 are transmitted, regularly or at the predetermined time, to the server apparatus 70 via the communication section 26.

In the case of exemplary system operation II, when the image/audio data and the additional data are transmitted to the server apparatus 70, this additional data includes the speed information (indicative of the moving speed of the user when the image data being transmitted was obtained by imaging) detected by the speed detection section 17, the location information (indicative of the location of the user when the image data being transmitted was obtained by imaging) detected by the location detection section 12, and the date/time information (indicative of the date and time when the image data being transmitted was obtained by imaging) obtained by the date/time calculation section 28.

The imaging/display apparatus 1 is capable of displaying a map image on the display section 2. In order to display the map image, the imaging/display apparatus 1 further includes a map database 29. In the case where the storage section 25 is formed by the HDD or the like, for example, the map database 29 may be stored in a partial area of the HDD or the like.

The map database 29 is a database containing, as information used for displaying a map as in a so-called navigation system, information for generating a map image corresponding to the location information, additional information such as names of points, search information, and so on.

The system controller 10 is capable of performing a process of searching for and displaying an appropriate map using the map database 29.

The structure of the imaging apparatus 30 will now be described below with reference to FIG. 5. Note that, in FIG. 5, components that have their counterparts in FIG. 4 are assigned the same reference numerals as those of their counterparts in FIG. 4, and descriptions thereof will be omitted. The imaging apparatus 30 illustrated in FIG. 5 is different from the imaging/display apparatus 1 illustrated in FIG. 4 in that the imaging apparatus 30 does not include the display section 2 for outputting the image, the audio output section 5 for outputting the audio, or the map database 29 used for displaying the map.

That is, while the imaging apparatus 30 is worn by the user as illustrated in FIG. 2 or is placed on various movable bodies as described above, the imaging apparatus 30 is capable of imaging by means of the imaging section 3, and transmitting the picked-up image data to the external device via the communication section 26 or recording the picked-up image data in the storage section 25.

The system controller 10 controls the imaging operation, a communication operation, a recording operation, and so on.

Note that in the case where the imaging apparatus 30 is mounted on a movable body such as the automobile, the railway vehicle, the watercraft, or the aircraft, a speed detection mechanism installed in the movable body may be employed as the speed detection section 17.

Figure 6:
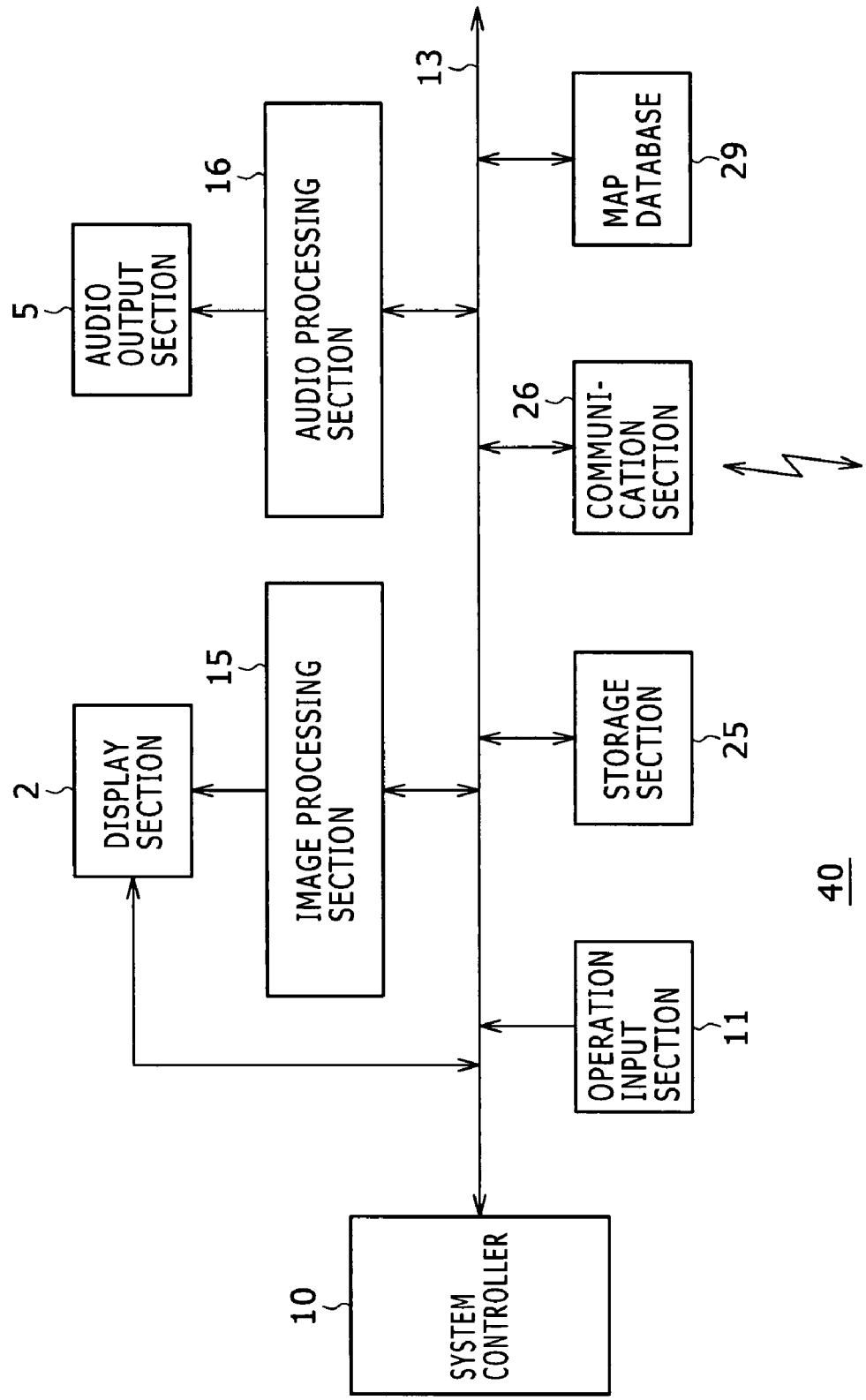
FIG. 6 is a block diagram of a display apparatus according to one embodiment of the present invention.

The exemplary structure of the display apparatus 40 will now be described below with reference to FIG. 6. Note that, in FIG. 6, components that have their counterparts in FIG. 4 are assigned the same reference numerals as those of their counterparts in FIG. 4, and descriptions thereof will be omitted. The display apparatus 40 illustrated in FIG. 6 is different from the imaging/display apparatus 1 illustrated in FIG. 4 in that the display apparatus 40 does not include the imaging section 3 for imaging or the audio input section 6 for audio input. Further, the display apparatus 40 is not provided with the illumination section 4 or the illumination control section 14, which are helpful for imaging. Still further, the display apparatus 40 need not be provided with the speed detection section 17.

Because the display apparatus 40 is not designed to transmit the image/audio data to the server apparatus 70, the display apparatus 40 need not be provided with the location detection section 12 or the date/time calculation section 28 for generating the location information or the date/time information to be transmitted to the server apparatus 70.

Needless to say, the system controller 10 need not have a capability to perform a process of controlling the transmission of the image/audio data to the server apparatus 70.

The display apparatus 40 is a device to be worn by the user in a manner as suggested by FIG. 2B, or carried by the user, or installed by the user in a house, the automobile, or the like. The display apparatus 40 receives, via the communication section 26, the image/audio data transmitted from the external device (the server apparatus 70). Then, the display apparatus 40 outputs the received image/audio data via the display section 2 and the audio output section 5, or records the received image/audio data in the storage section 25.

The system controller 10 controls the communication operation, the display operation, an audio output operation, the recording operation, and so on.

In the case where the display apparatus is fixedly installed in the house or the like, the communication section 26 may be configured to perform network communication via wired connection.

Both the imaging apparatus 30 as illustrated in FIG. 2A and the display apparatus 40 as illustrated in FIG. 2B may be used by the same user, as user F illustrated in FIG. 3 does, so that the imaging apparatus 30 and the display apparatus 40 combine to fulfill functions similar to those of the imaging/display apparatus 1.

Figure 7:
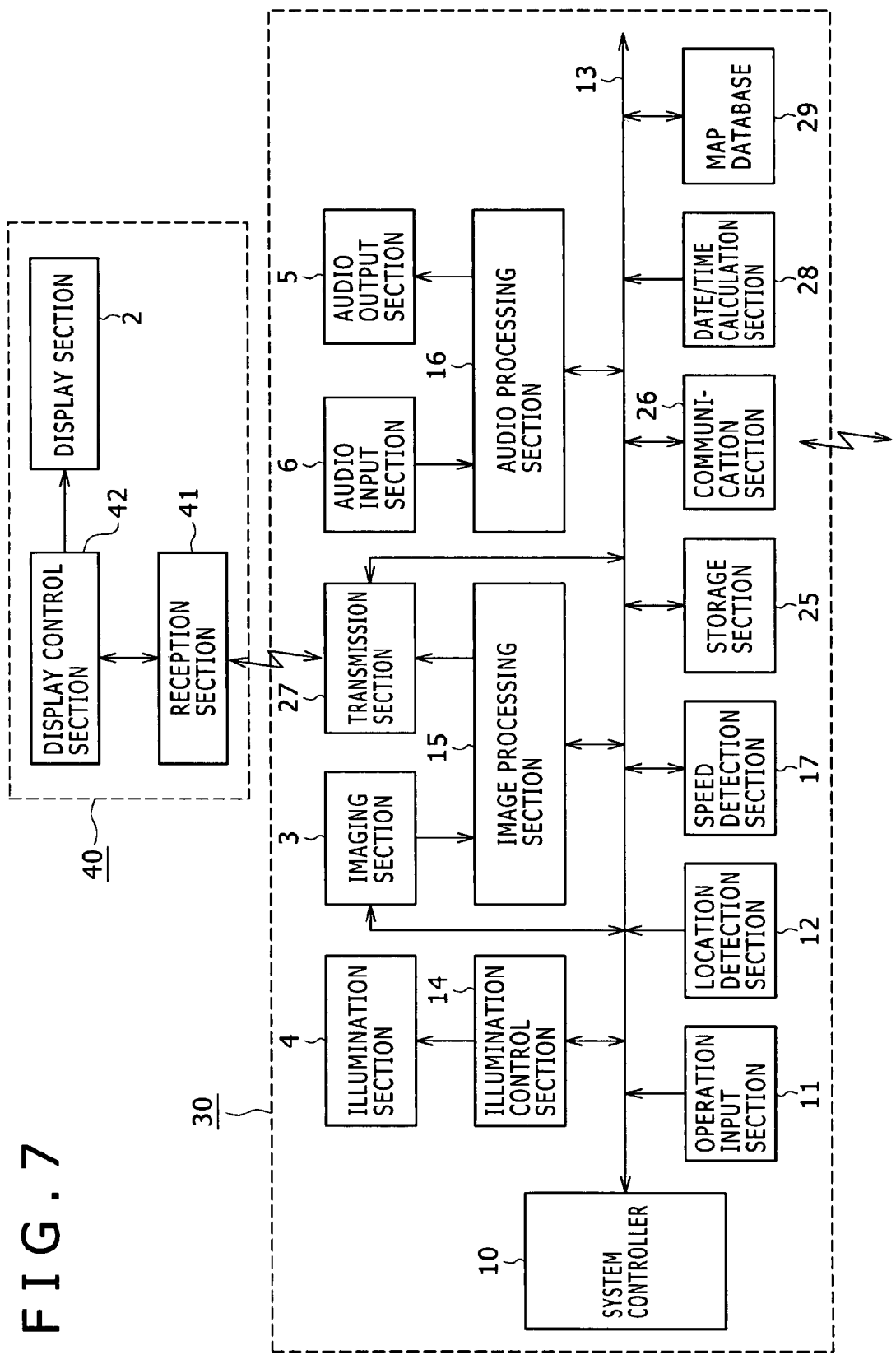
FIG. 7 is a block diagram of an imaging apparatus and a display apparatus according to one embodiment of the present invention.

In this case, the imaging apparatus 30 and the display apparatus 40 may have a configuration as illustrated in FIG. 7.

Figure 4:
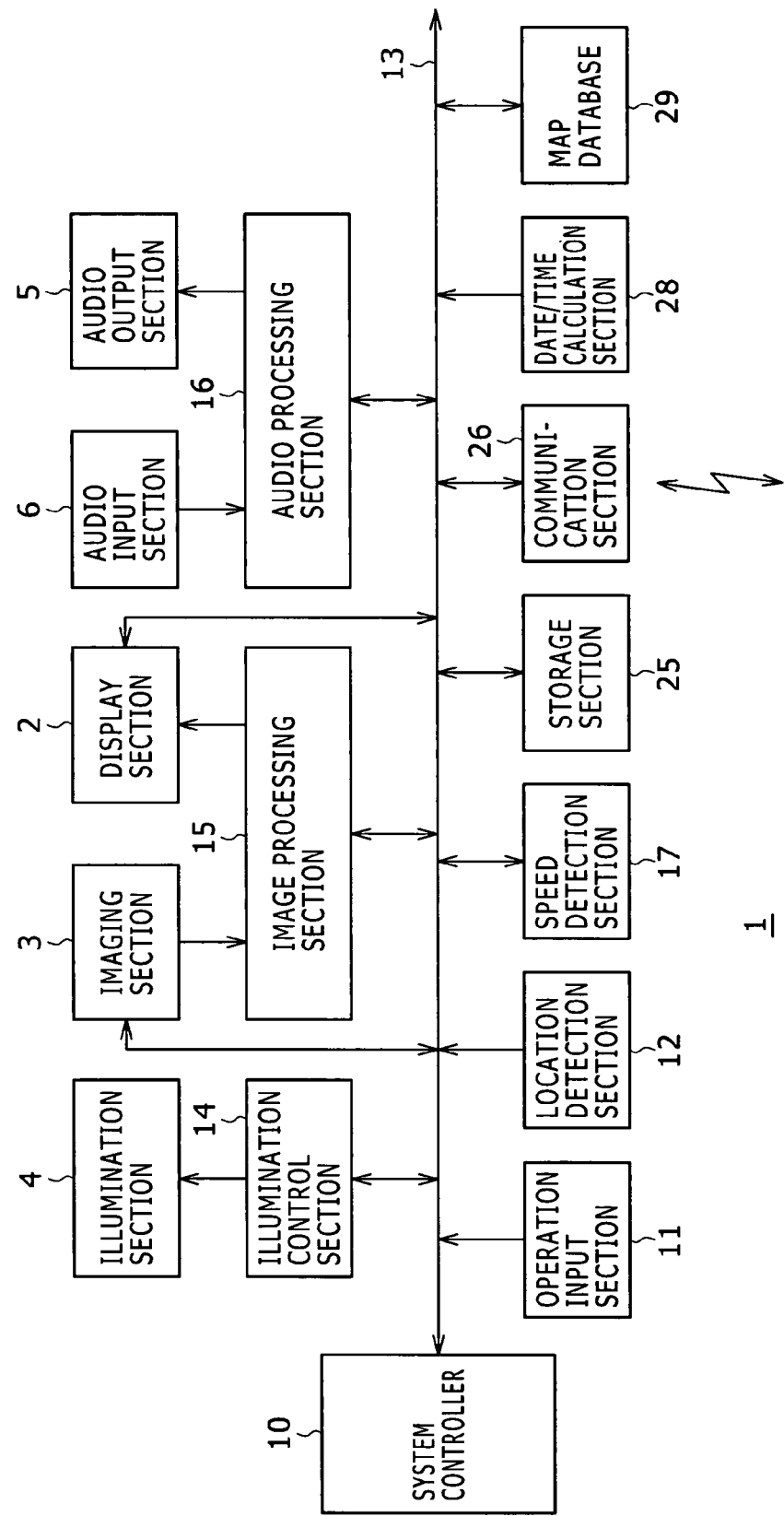
FIG. 4 is a block diagram of an imaging/display apparatus according to one embodiment of the present invention.
Figure 5:
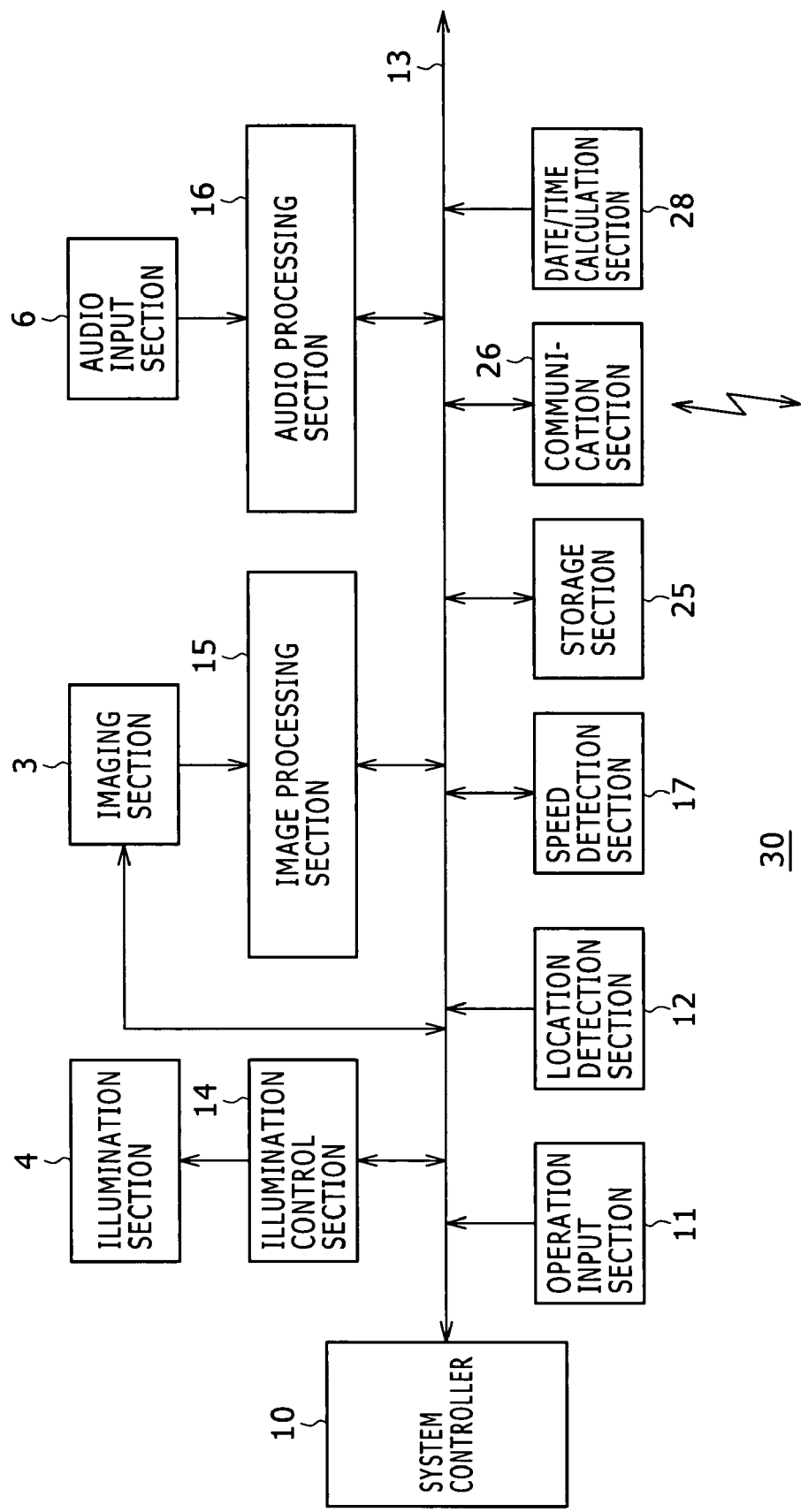
FIG. 5 is a block diagram of an imaging apparatus according to one embodiment of the present invention.

In the exemplary configuration of FIG. 7, the imaging apparatus 30 has substantially the same structure as that of the imaging/display apparatus 1 illustrated in FIG. 4, except that the imaging apparatus 30 is not provided with the display section 2 but is provided with a transmission section 27 instead.

The transmission section 27 encodes image data supplied from the image processing section 15 as image data to be displayed for monitoring so that the image data can be transmitted to the display apparatus 40. Then, the transmission section 27 transmits the encoded image data to the display apparatus 40.

The display apparatus 40 includes a reception section 41, a display control section 42, and the display section 2.

The reception section 41 performs data communication with the transmission section 27 in the imaging apparatus 30. The reception section 41 receives the image data transmitted from the imaging apparatus 30, and decodes the received image data.

The image data decoded by the reception section 41 is supplied to the display control section 42. The display control section 42 performs signal processing, screen splitting, character synthesis, or the like for presenting a display concerning the image data to generate an image signal used for the display, and supplies the generated image signal to the display section 2, which has the display panel section 2a such as the liquid crystal display.

In accordance with the image signal used for the display, the display section 2 applies driving signals based on a video signal to the pixels arranged in a matrix in the display panel section 2a with predetermined horizontal/vertical driving timing for displaying.

When the imaging apparatus 30 and the display apparatus 40 have the above configuration, the user who is wearing the imaging apparatus 30 and the display apparatus 40 like user F in FIG. 3 is able to use the two apparatuses in a manner similar to the manner in which the imaging/display apparatus 1 is used.

Figure 8:
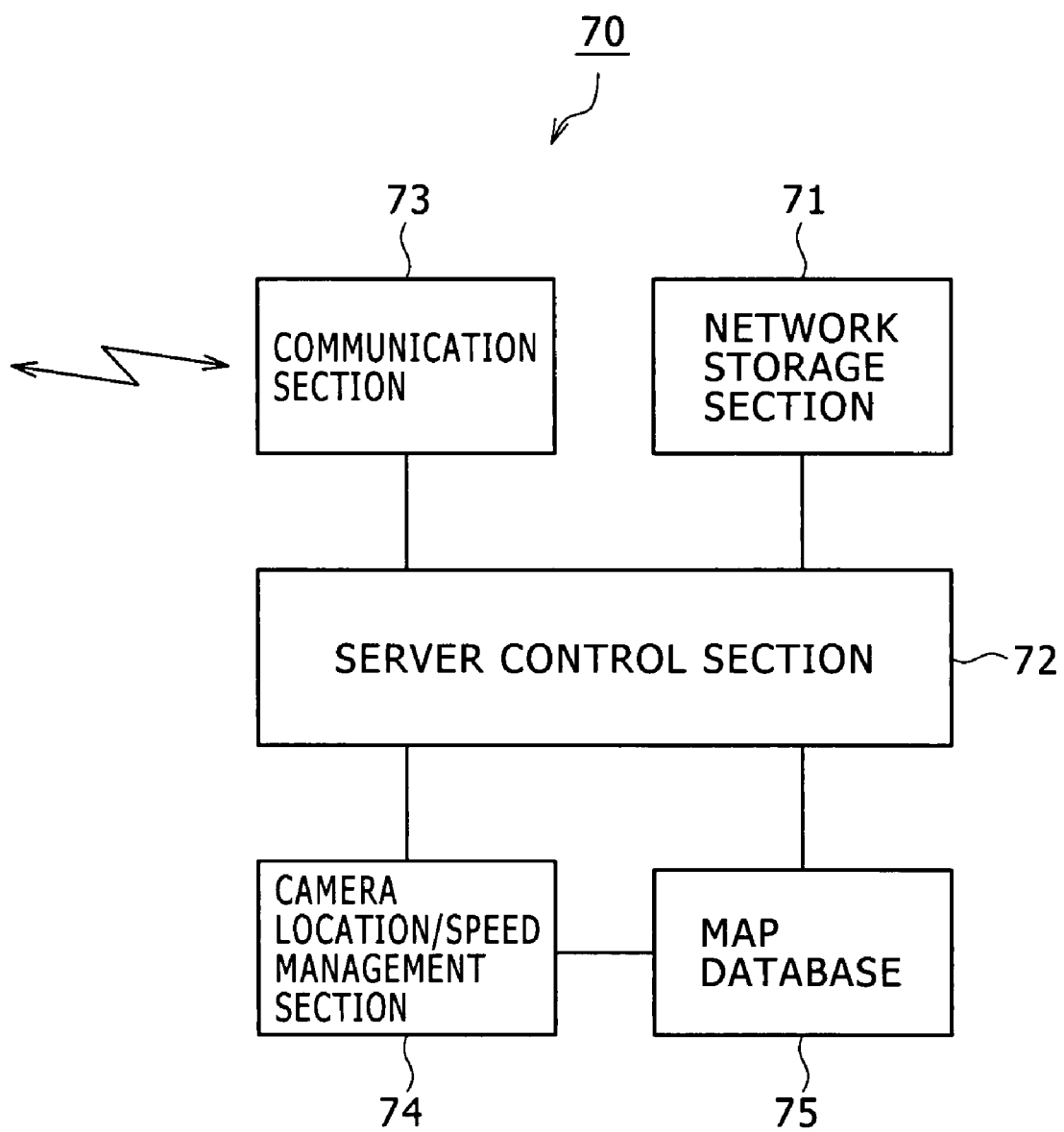
FIG. 8 is a block diagram of a server apparatus according to one embodiment of the present invention.

The exemplary structure of the server apparatus 70 will now be described below with reference to FIG. 8.

The server apparatus 70 includes a server control section 72, a network storage section 71, a communication section 73, a camera location/speed management section 74, and a map database 75.

The network storage section 71 is formed by an HDD or the like, for example, and is used for buffering or storing the image data and the audio data or for storing various types of information. In the case of exemplary system operation II, the speed image database described below is stored in the network storage section 71. As described below with reference to FIG. 12, the speed image database is a database in which the image/audio data and the additional data received from the imaging apparatus 30 or the imaging/display apparatus 1 via the network 60 are accumulated.

The communication section 73 performs data communication with the communication section 26 of each of the imaging/display apparatus 1, the imaging apparatus 30, and the display apparatus 40 via the network 60.

The server control section 72 performs operation control necessary for the server apparatus 70. Specifically, the server control section 72 controls a communication operation performed between the imaging/display apparatus 1, the imaging apparatus 30, and the display apparatus 40, a process of storing the image/audio data in the network storage section 71, a searching process, and so on.

The camera location/speed management section 74 and the map database 75 are components required when implementing exemplary system operation I described below. The camera location/speed management section 74 performs processes such as management and search of the current location and speed of the imaging/display apparatus 1 or the imaging apparatus 30 (i.e., of the movable body on which the imaging/display apparatus 1 or the imaging apparatus 30 is mounted). Specifically, the camera location/speed management section 74 manages the speed information and the location information regularly transmitted from the imaging/display apparatus 1 and the imaging apparatus 30 using a camera location/speed management table as illustrated in FIG. 10 described below, for example. Further, the camera location/speed management section 74 is capable of achieving more detailed management of the current locations of the imaging/display apparatus 1 and the imaging apparatus 30 by comparing them with map information stored in the map database 75.

While the structures of the imaging/display apparatus 1, the imaging apparatus 30, the display apparatus 40, and the server apparatus 70 have been described above, it will be appreciated that each of these structures is merely an example. Needless to say, addition or omission of a component(s) is possible in a variety of manners in accordance with an actual system operation or functionality as implemented. It will be appreciated that appropriate structures of the imaging apparatus 30, the imaging/display apparatus 1, and the display apparatus 40 depend upon the type of movable body on which the imaging apparatus 30 or the imaging/display apparatus 1 is mounted (placed) or upon the form (e.g., a watch shape, a portable type, a stationary type, etc.) of the display apparatus 40.

[4. Exemplary System Operation I]

Hereinafter, exemplary system operations according to the present embodiment will be described.

Designations "apparatus A" and "apparatus B" will be used in the following description.

The designation "apparatus A" refers to the imaging/display apparatus 1 or the display apparatus 40 as illustrated in FIG. 3. The designation "apparatus B" refers to the imaging/display apparatus 1 or the imaging apparatus 30 as illustrated in FIG. 3.

In other words, "apparatus A" refers to devices that are used by a user and receive and display an image taken at another movable body from the server apparatus 70, and corresponds to the "display apparatus" as recited in the appended claims.

On the other hand, "apparatus B" refers to devices that transmit images to the server apparatus 70 and are worn by or mounted on a person, a creature, a vehicle, or other movable bodies as mentioned previously, and corresponds to the "imaging apparatus" as recited in the appended claims.

Exemplary system operation I will now be described below with reference to FIGS. 9 and 10.

In exemplary system operation I, image data of an images taken by an apparatus B (i.e., the imaging apparatus 30 or the imaging/display apparatus 1) is transferred in real time to an apparatus A (i.e., the display apparatus 40 or the imaging/display apparatus 1) via the server apparatus 70.

In this case, the server apparatus 70 uses the camera location/speed management section 74 to always recognize the moving speed and current location of each apparatus B (i.e., each movable body on which the apparatus B is mounted). Thus, when the speed specification information and location specification information are accepted from an apparatus A, the server apparatus 70 is able to identify a desired apparatus B based on the speed specification information and the location specification information. The server apparatus 70 requests the identified apparatus B to transmit the image data. After the transmission of the image data of the image taken by the apparatus B is started, the server apparatus 70 forwards the image data to the apparatus A. The apparatus A receives the image data from the server apparatus 70 and displays the received image data. As a result, the user of the apparatus A is able to see a displayed image of a current scene taken by the apparatus B moving at the specified speed at the specified location.

Figure 9:
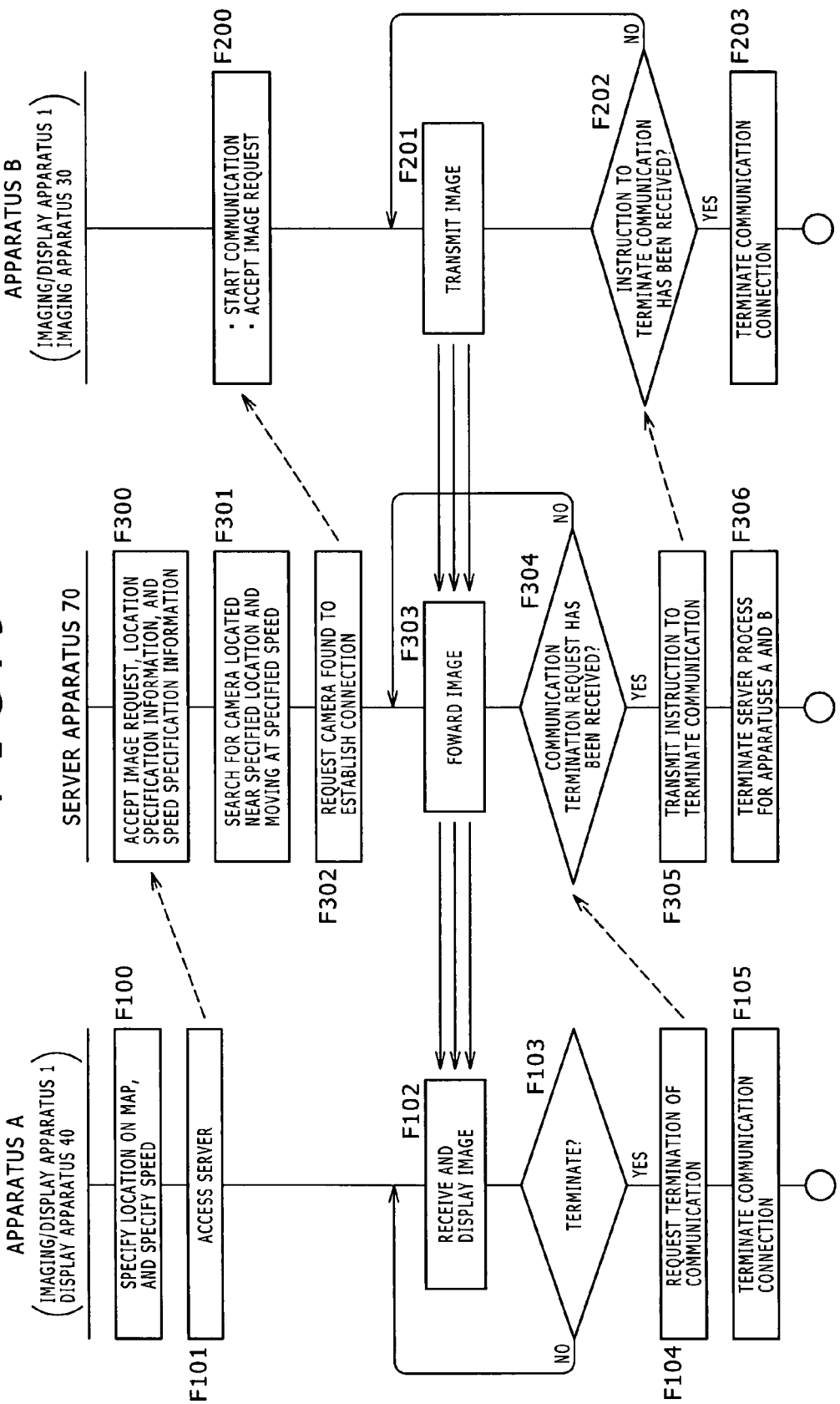
FIG. 9 is a flowchart of exemplary system operation I according to one embodiment of the present invention.

FIG. 9 illustrates a procedure performed by the system controller 10 of the apparatus A (i.e., the imaging/display apparatus 1 or the display apparatus 40), a procedure performed by the server control section 72 of the server apparatus 70, and a procedure performed by the system controller 10 of the apparatus B (i.e., the imaging/display apparatus 1 or the imaging apparatus 30).

First, at step F100, on the part of the apparatus A, a location specification process and a speed specification process are performed using the map image.

For example, first, the system controller 10 of the apparatus A uses data in the map database 29 to display the map on the display section 2 as a preparation for location specification. In accordance with the user operation, the system controller 10 of the apparatus A also performs a search for a particular area on the map, scrolling, and so on. Thus, the user is able to view a map image of a specific region or area on the display section 2.

Figure 14A:
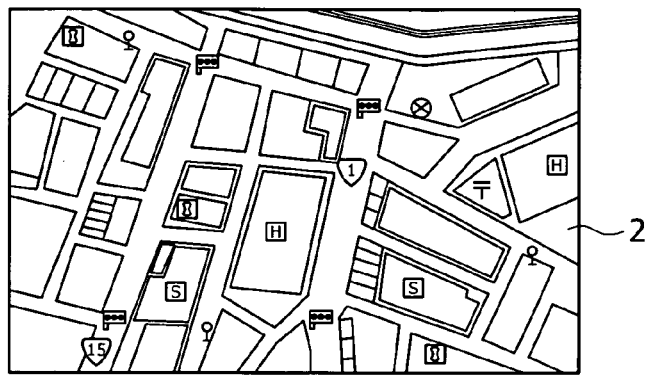
FIGS. 14A to 14D are illustrations of images used when specifying a location and a speed in one embodiment of the present invention.

For example, when the user has specified a place name or a scale or has performed scrolling, the system controller 10 changes the area being displayed or the scale to cause a map image of a certain area to be displayed as illustrated in FIG. 14A, for example.

Figure 14B:
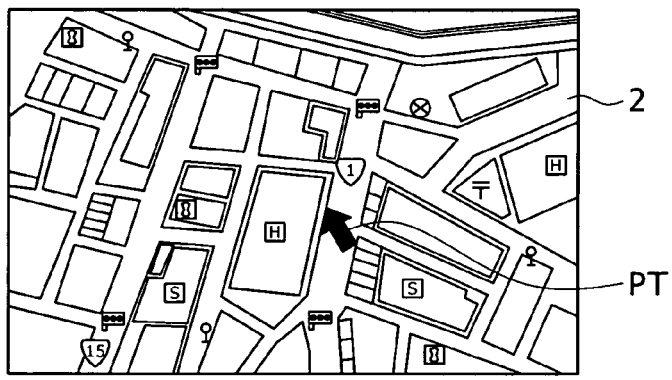

The system controller 10 causes a pointer PT to be displayed on the map image as illustrated in FIG. 14B, and allows the pointer PT to be moved on the map image in accordance with the user operation. That is, by moving the pointer PT to a desired location on the map image and performing a predetermined operation, the user is able to specify a specific location on the map image.

Note that use of the pointer PT is not essential. For example, the display section 2 may be configured to accept a touch panel operation so that the user can specify the desired location by touching that location on the map image with a finger.

In response to the user performing the operation of specifying a certain point on the map image in such a manner, the system controller 10 generates the location specification information. The location specification information includes values of a latitude and longitude of the point specified by the user on the map image.

Figure 14C:
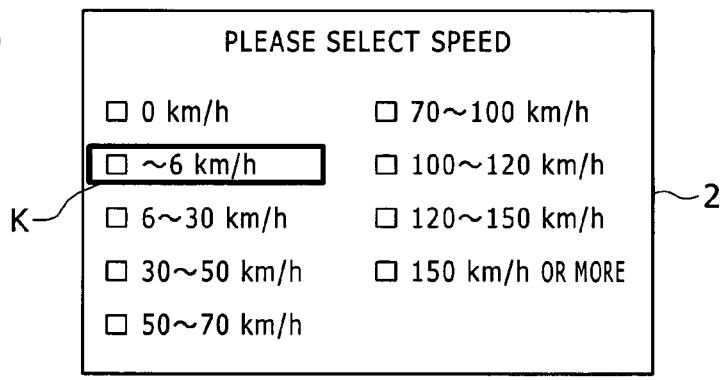

In addition, in accordance with a user input, the system controller 10 of the apparatus A generates the speed specification information. For example, the system controller 10 causes a speed selection screen as illustrated in FIG. 14C to be displayed on the display section 2. Thus, for example, the user is allowed to select: a zero speed (i.e., an unmoving state); a speed of 6 km/h or less, at which people normally walk; a range of speeds between 6 and 30 km/h, at which people normally run or bicycles normally travel; a range of speeds between 30 and 50 km/h, at which automobiles or the like normally travel; or the like. For example, the system controller 10 causes a cursor K to be displayed so as to be able to select any option, and allows the cursor K to be moved in accordance with the user operation. The user selects his or her desired speed by performing an operation of moving the cursor K so as to select the desired speed and an operation of determining the selection. Naturally, the display section 2 may be configured to accept a touch panel operation so that the user can select his or her desired option (speed) by touching it with a finger.

In response to the user selecting and determining his or her desired speed, the system controller 10 sets the speed specification information.

Figure 14D:
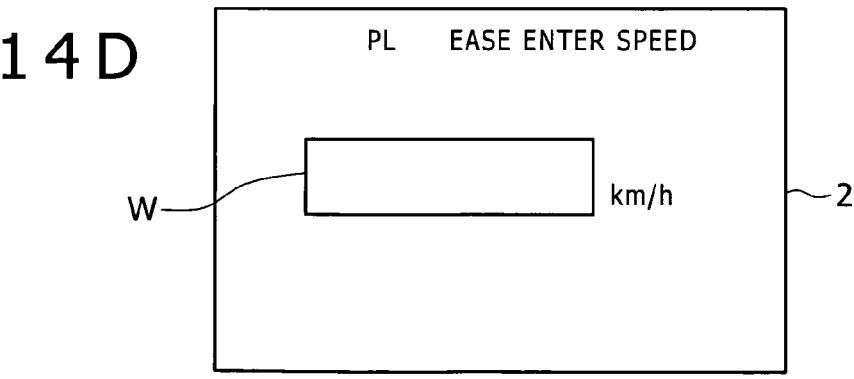

Note that it is not essential that options to be selected by the user be prepared as in the above example. For example, the system controller 10 may cause an input box W as illustrated in FIG. 14D to be displayed on the display section 2 so that the user can enter a numerical value for specifying the speed.

Also note that the speed specified need not be a specific numerical value. For example, easily-discernible descriptive options such as "normal walking speeds", "normal bicycle speeds", "normal automobile speeds", and "normal train speeds" may be prepared to be selected by the user.

In response to the user entering a specific speed or speed range in such a manner as described above, the system controller 10 sets the specific speed or speed range as the speed specification information.

After generating the location specification information and the speed specification information at step F100, the system controller 10 of the apparatus A accesses the server apparatus 70 at step F101. In other words, the system controller 10 of the apparatus A establishes a communication connection with the server apparatus 70. At this time, the system controller 10 of the apparatus A transmits information of an image request, the speed specification information, and the location specification information to the server apparatus 70.

At step F300, the server control section 72 of the server apparatus 70 establishes the communication connection with the apparatus A, and accepts the image request, the speed specification information, and the location specification information.

Then, at step F301, the server control section 72 searches for an apparatus B (an imaging/display apparatus 1 or an imaging apparatus 30) that is currently located near the specified location indicated by the location specification information and moving at the speed indicated by the speed specification information (or at a speed close to that speed).

Note that it has been assumed that, for the sake of this search, all imaging/display apparatuses 1 and imaging apparatuses 30 that are potential image sources transmit, constantly or regularly, their own current location information (i.e., the latitude and longitude of their current location) and current speed information to the server apparatus 70.

In the server apparatus 70, the camera location/speed management section 74 manages, with respect to each of the imaging/display apparatuses 1 and the imaging apparatuses 30, the current location information and the current speed information so as to be associated with the camera ID.

For example, the camera location/speed management section 74 includes the camera location/speed management table as illustrated in FIG. 10. The camera location/speed management table is a table in which the current location information (cp1, cp2, ...) and the current speed information (cv1, cv2, ...) are stored so as to be associated with the camera ID (CM001, CM002, ...).

Every time the current location information and the current speed information are received from any of the imaging/display apparatuses 1 and the imaging apparatuses 30, the current location information and the current speed information that are associated with the camera ID of the imaging/display apparatus 1 or imaging apparatus 30 that transmitted the received current location information and current speed information are updated in the camera location/speed management table. This makes it possible to recognize the current location and speed of each of the imaging/display apparatuses 1 and the imaging apparatuses 30 (i.e., all potential image sources).

For example, assuming that an apparatus B whose camera ID is "CM001" regularly transmits the current location information and the current speed information to the server apparatus 70, current location information cp1 and current speed information cv1 that are associated with "CM001" are regularly updated in the camera location/speed management table.

At step F301, the server control section 72 causes the camera location/speed management section 74 to search for an imaging/display apparatus 1 or imaging apparatus 30 that is currently located near the location whose longitude and latitude are included in the location specification information and moving at the speed indicated by the speed specification information, and identifies one imaging/display apparatus 1 or imaging apparatus 30 as a currently desired apparatus B.

If one certain imaging/display apparatus 1 or imaging apparatus 30 is identified as the currently desired apparatus B based on the speed specification information and the location specification information, the server control section 72, at step F302, requests that apparatus B to establish a communication connection with the apparatus B. Then, the server control section 72 notifies the apparatus B of the image request from the apparatus A.

Although not shown in FIG. 9, it may happen that no imaging/display apparatuses 1 or imaging apparatuses 30 currently exists near the location indicated by the location specification information. It may also happen that although one or more imaging/display apparatuses 1 or imaging apparatuses 30 currently exist near the location indicated by the location specification information, none of those apparatuses are moving at the speed indicated by the speed specification information.

In such cases, the server control section 72 notifies the apparatus A that no apparatus B that matches the location specification information and the speed specification information has been found, and that providing of an image is impossible. In response thereto, the apparatus A informs the user of the impossibility of the providing of an image, and finishes its procedure.

Also, it may happen that a plurality of imaging/display apparatuses 1 or imaging apparatuses 30 that are currently located near the location indicated by the location specification information and moving at the speed indicated by the speed specification information are found. In this case, of the apparatuses found, the apparatus whose information in the camera location/speed management table was updated most recently may be selected, or the apparatus that is the first to establish the communication connection with the server apparatus 70 in response to the communication request at step F302 may be selected.

At step F200, the system controller 10 of the apparatus B that has received the connection request as a result of the process of step F302 performed by the server apparatus 70 performs a process of establishing the communication connection with the server apparatus 70 in accordance with the connection request, and starts communicating with the server apparatus 70 and accepts the image request.

At step F201, in response to the image request, the apparatus B performs a process of transmitting the image. Specifically, the system controller 10 of the apparatus B causes the image data obtained by imaging by the imaging section 3 and the audio data obtained by sound collecting by the audio input section 6 to be transmitted to the server apparatus 70 via the communication section 26.

At step F303, the server apparatus 70 forwards the image data (and the audio data) transmitted from the apparatus B to the apparatus A.

At step F102, the apparatus A receives the image data (and the audio data) transmitted from the apparatus B through the server apparatus 70, and displays the received image data. Specifically, the system controller 10 of the apparatus A causes the image data (and the audio data) received and demodulated by the communication section 26 to be supplied to the image processing section 15 and the audio processing section 16, and causes the image to be displayed on the display section 2 and the audio to be outputted via the audio output section 5.

The system controller 10 of the apparatus A continues to output the received image data via the display section 2 (and the received audio data via the audio output section 5) until it is determined at step F103 that the output of the image/audio data should be terminated. Meanwhile, the apparatus B continues to take images and transmit the image data of the images taken (and the audio data) until a communication termination request is received.

Therefore, during this period, the user of the apparatus A is able to watch scenes taken by the apparatus B placed on a movable body that is located near the location specified by the user and moving at the speed specified by the user.

At step F103, the system controller 10 of the apparatus A determines whether or not displaying of the image should be terminated. For example, the system controller 10 of the apparatus A determines that the displaying of the image should be terminated when the user has performed an operation for terminating the displaying of the image using the operation input section 11. Also, the displaying of the image may be automatically terminated when the reception and displaying of the image data has continued for a predetermined period of time. If it is determined based on the user operation or another condition for termination that the displaying of the image should be terminated, control proceeds to step F104. At step F104, the system controller 10 of the apparatus A causes the communication termination request to be transmitted to the server apparatus 70 via the communication section 26.

The server apparatus 70 continues the forwarding process at step F303 until the communication termination request is received. Upon receipt of the communication termination request, the server control section 72 of the server apparatus 70 proceeds from step F304 to step F305, and transmits an instruction to terminate the communication to the apparatus B.

If the system controller 10 of the apparatus B recognizes at step F202 that the instruction to terminate the communication has been received, it proceeds to step F203.

At step F105, the system controller 10 of the apparatus A performs a process of terminating the communication connection with the server apparatus 70. At step F203, the system controller 10 of the apparatus B performs a process of terminating the communication connection with the server apparatus 70. At step F306, the server control section 72 of the server apparatus 70 terminates the communication between the apparatuses A and B and a server process. As a result, this system operation is finished.

According to the above-described procedures, by specifying an arbitrary location using the map image and specifying an arbitrary speed, the user of the apparatus A is able to watch the image of the scene obtained by the apparatus B mounted on the movable body that is located near the specified location and moving at the specified speed with the apparatus A which the user is wearing or carrying.

Exemplary images which the user of the apparatus A can see are illustrated in FIGS. 15A to 15D.

Figure 15A:
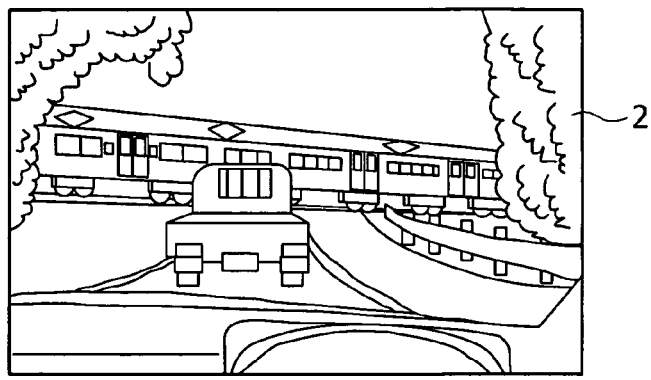
FIGS. 15A to 15D are illustrations of taken images to be displayed in one embodiment of the present invention.
Figure 15B:
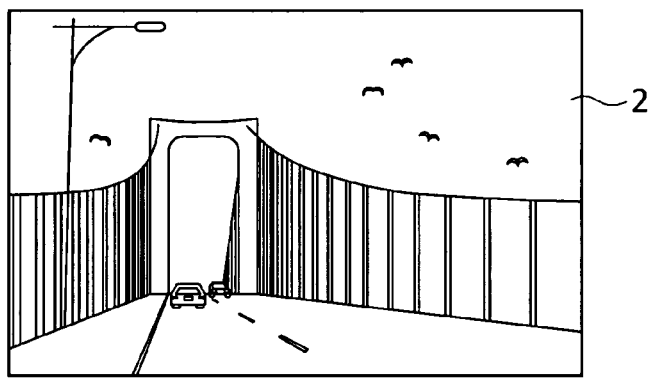

Referring to FIGS. 15A and 15B, if the user of the apparatus A specifies a point on a certain road on the map and specifies a certain speed, for example, the user can see an image of a scene that can be viewed from an automobile or the like that is currently moving at the specified speed near the specified point. Such images are, for example, images that are being taken by the imaging apparatus 30 attached to, for example, the automobile, or the imaging apparatus 30 or the imaging/display apparatus 1 worn by a driver of the automobile that is moving at the specified speed (or that is not moving, in the case where the specified speed is zero) near the specified point.

Figure 15C:
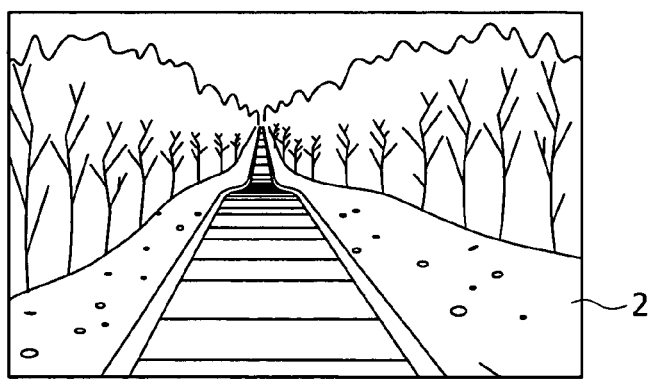

Referring to FIG. 15C, if the user of the apparatus A specifies a point on a certain railway track on the map and specifies a certain speed, for example, the user can see an image taken by the apparatus B such as the imaging apparatus 30 placed on a railway vehicle that is currently traveling near the specified point, or the imaging apparatus 30 or imaging/display apparatus 1 that is worn by a train driver of the railway vehicle.

Figure 15D:
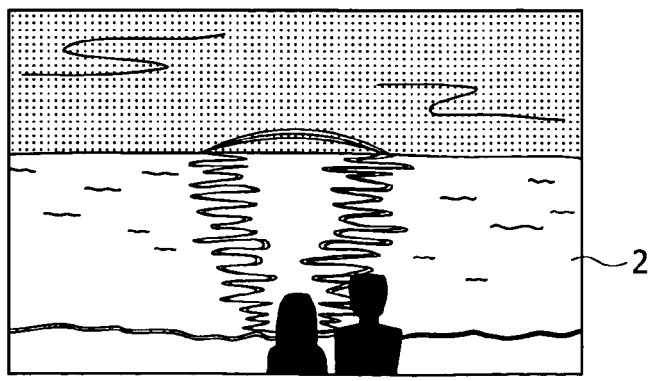

Referring to FIG. 15D, if the user of the apparatus A specifies a point in a certain resort on the map and specifies a human walking speed, for example, the user can see an image taken by the apparatus B such as the imaging apparatus 30 or imaging/display apparatus 1 that is worn by a person who is currently walking at the specified point.

As in the above examples, by specifying a point on the map and a moving speed, the user of the apparatus A can see an image actually taken by the apparatus B that is moving at the specified speed at the specified point.

While it has been assumed in the above-described exemplary operation that the map is displayed on the part of the apparatus A and the user specifies a certain location on the map, the displaying of the map is not essential to the present invention. For example, the user of the apparatus A may enter a specific place name, address, or the like so that the entered place name, address, or the like is transmitted to the server apparatus 70 as the location specification information. In this case, the server apparatus 70 may use the map database 75 to identify a location (e.g., the latitude and longitude thereof) corresponding to the place name, the address, or the like, and search for the apparatus B located near the identified location.

Further, instead of the specific location, an unspecific location may be specified. For example, unspecific information such as "mountain", "beach", "woodland", "sea surface", "undersea", or "sky" may be used as the location specification information. In this case, the server apparatus 70 may search for the apparatus B located at a location corresponding to the unspecific information.

[5. Exemplary System Operation II]

Exemplary system operation II will now be described below. In exemplary system operation II, the image data obtained by imaging by the apparatus B is accumulated in the server apparatus 70, and the accumulated image data is read and supplied to the apparatus A.

In this exemplary operation, the image data obtained by imaging by the apparatus B (i.e., the imaging apparatus 30 or the imaging/display apparatus 1) mounted on the movable body is transmitted to the server apparatus 70 together with the additional data including the speed information indicative of the moving speed at the time of imaging and the location information indicative of the location at the time of imaging, and the image data and the additional data transmitted are stored in the server apparatus 70. Accordingly, in the server apparatus 70, the image data obtained by imaging by each of a large number of apparatuses B located at a variety of places is accumulated together with the corresponding speed information and location information. Thus, if a speed and a location are specified at the apparatus A (i.e., the display apparatus 40 or the imaging/display apparatus 1) and the speed specification information and the location specification information are transmitted to the server apparatus 70, the server apparatus 70 is able to search for appropriate image data based on the speed specification information and the location specification information. The server apparatus 70 searches for and reads the image data that matches the speed specification information and the location specification information, and transmits the read image data to the apparatus A. The apparatus A receives and displays the image data. As a result, the user of the apparatus A can see a displayed image of a past scene that was taken by the apparatus B that was moving at the specified speed at the specified location.

Exemplary system operation II will now be described below with reference to FIGS. 11, 12, and 13.

Figure 11:
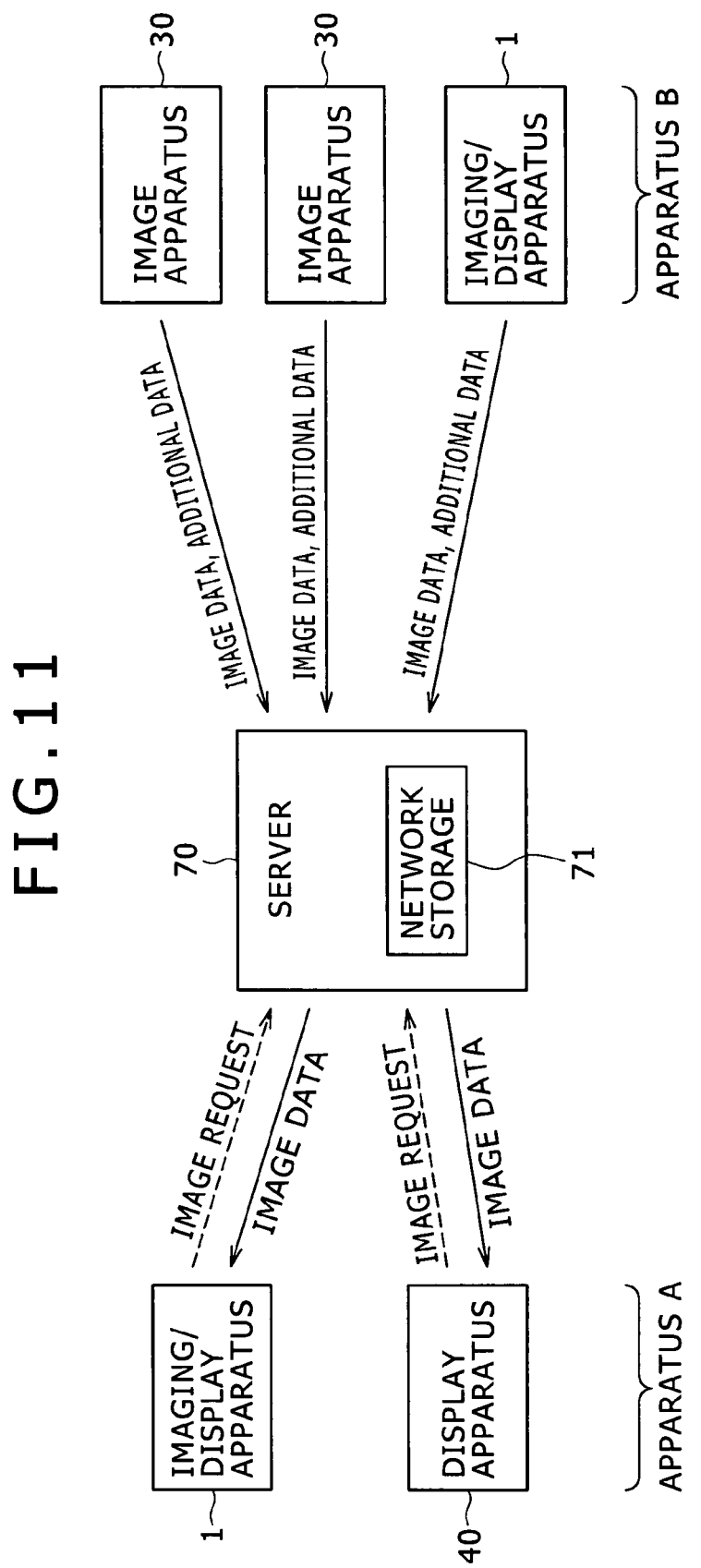
FIG. 11 is a diagram illustrating exemplary system operation II according to one embodiment of the present invention.

FIG. 11 illustrates the imaging/display apparatus 1 and the display apparatus 40 which function as the apparatus A, the server apparatus 70, and the imaging/display apparatus 1 and the imaging apparatuses 30 which function as the apparatus B.

The imaging apparatuses 30 and the imaging/display apparatus 1 which function as the apparatus B perform a process of transmitting the image data obtained by imaging (and the audio data) to the server apparatus 70.

For example, the imaging apparatuses 30 and the imaging/display apparatus 1 which function as the apparatus B may constantly image and transmit the taken image data (and the audio data) to the server apparatus 70. In the case where imaging is performed only at specified times, the imaging apparatuses 30 and the imaging/display apparatus 1 which function as the apparatus B may transmit the picked-up image data (and the audio data) to the server apparatus 70 every time imaging has been performed. For example, imaging and transmission of the image data may be performed regularly. In the case of the apparatus B worn by the user, imaging and the transmission of the image data may be performed based on a user operation. Further, the server apparatus 70 may transmit to the apparatus B a request for imaging together with location information indicative of a specified location. In this case, the system controller 10 of the apparatus B may automatically take and transmit image data obtained by imaging to the server apparatus 70 when the system controller 10 has determined that the current location of the apparatus B corresponds to the specified location indicated by the location information.

As noted previously, the imaging apparatus 30 and the imaging/display apparatus 1 which function as the apparatus B also transmit the additional data when transmitting the image/audio data to the server apparatus 70.

The additional data includes image management information concerning the image/audio data transmitted, the speed information indicative of the speed when the image data was obtained by imaging, the location information indicative of the location at which the image data was obtained by imaging, and the date/time information indicative of the date and time when the image data was obtained by imaging.

The server apparatus 70 stores the image data (and the audio data) and the additional data transmitted from each of the imaging/display apparatus 1 and the imaging apparatuses 30 in the speed image database in the network storage section 71.

That is, upon receipt of the image data (and the audio data) and the additional data from the apparatus B via the communication section 73, the server control section 72 performs a process of registering the received data in the speed image database in the network storage section 71.

Figure 12:
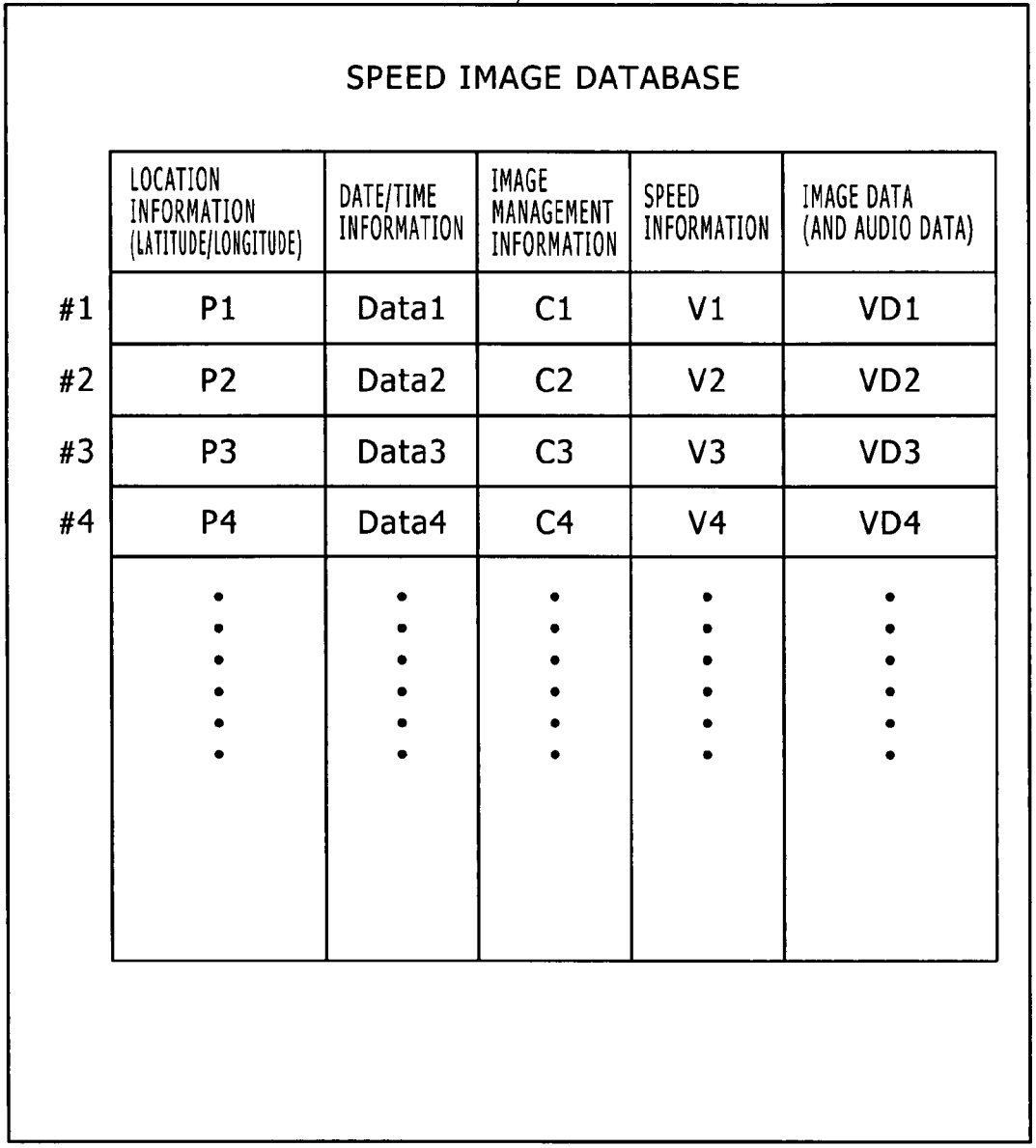
FIG. 12 is a diagram illustrating a speed image database according to one embodiment of the present invention.

FIG. 12 schematically illustrates contents recorded in the speed image database.

In the speed image database, the image data transmitted from each of the imaging/display apparatuses 1 and the imaging apparatuses 30 which function as the apparatus B are segmented into and registered as entries #1, #2, and so on. Segmentation of the image data may be based on the size of the image data, a playback time, or the like. For example, a maximum data size, a maximum playback time, or the like may be determined. In the case where the image data is transmitted from the apparatus B as a continuous video, the continuous video may be divided into different entries at a point where the location information indicative of the location where the image data was obtained by photographing changes. The manner in which the image data is segmented into different entries may be determined appropriately depending on the form of the transmission of the image data from the apparatus B, or duration of transmission, or according to convenience for management information of the speed image database or convenience for an image providing service provided by the server apparatus 70, for example.

Referring to FIG. 12, while image data (and audio data) VD1, VD2, VD3, and so on are recorded as entries, location information P1, P2, P3, and so on, date/time information Date1, Date2, Date3, and so on, image management information C1, C2, C3, and so on, and speed information V1, V2, V3, and so on are recorded so as to be associated with the image data VD1, VD2, VD3, and so on, respectively.

The location information, the date/time information, the image management information, and the speed information are the additional data transmitted from the apparatus B together with the image data.

For example, regarding the entry #1, the location information P1 is location information indicative of a location where an image of the image data VD1 was taken, and is, for example, information of the latitude and longitude of that location.

The date/time information Date1 is information indicative of a date and time (year, month, day, hour, minute, second) when the image of the image data VD1 was taken.

The speed information V1 is information indicative of a moving speed when the image of the image data VD1 was taken.

The image management information C1 is management information of the image data VD1, and includes, for example, an image type, a data size, a compression algorithm, the identification information of the apparatus B, and imaging location-related information such as information of a name of the location where the image of the image data VD1 was taken. Note that the imaging location-related information may be retrieved from the map database 29 in the imaging/display apparatus 1 or imaging apparatus 30 that functions as the apparatus B based on the current location information at the time of imaging, and then the system controller 10 of the apparatus B may add the retrieved imaging location-related information to the additional data to be transmitted to the server apparatus 70. Alternatively, the server apparatus 70 may retrieve the imaging location-related information from the map database 75 based on the location information P1.

As described above, each of the imaging/display apparatuses 1 and the imaging apparatuses 30 that function as the apparatus B transmits the image data and the additional data to the server apparatus 70 as illustrated in FIG. 11. As a result, the image data of the images taken at a variety of places and at a variety of speeds is accumulated in the speed image database as illustrated in FIG. 12.

As a result of the accumulation of the images taken at a variety of places and at a variety of speeds in the server apparatus 70, the server apparatus 70 becomes able to provide the image providing service to the user of the apparatus A.

An exemplary operation in which the imaging/display apparatus 1 or display apparatus 40 that functions as the apparatus A communicates with the server apparatus 70 and acquires the image data from the server apparatus 70 to display the acquired image data will now be described below. In other words, this exemplary operation is an operation in which the user of the apparatus A enjoys the image providing service provided by the server apparatus 70.

Figure 13:
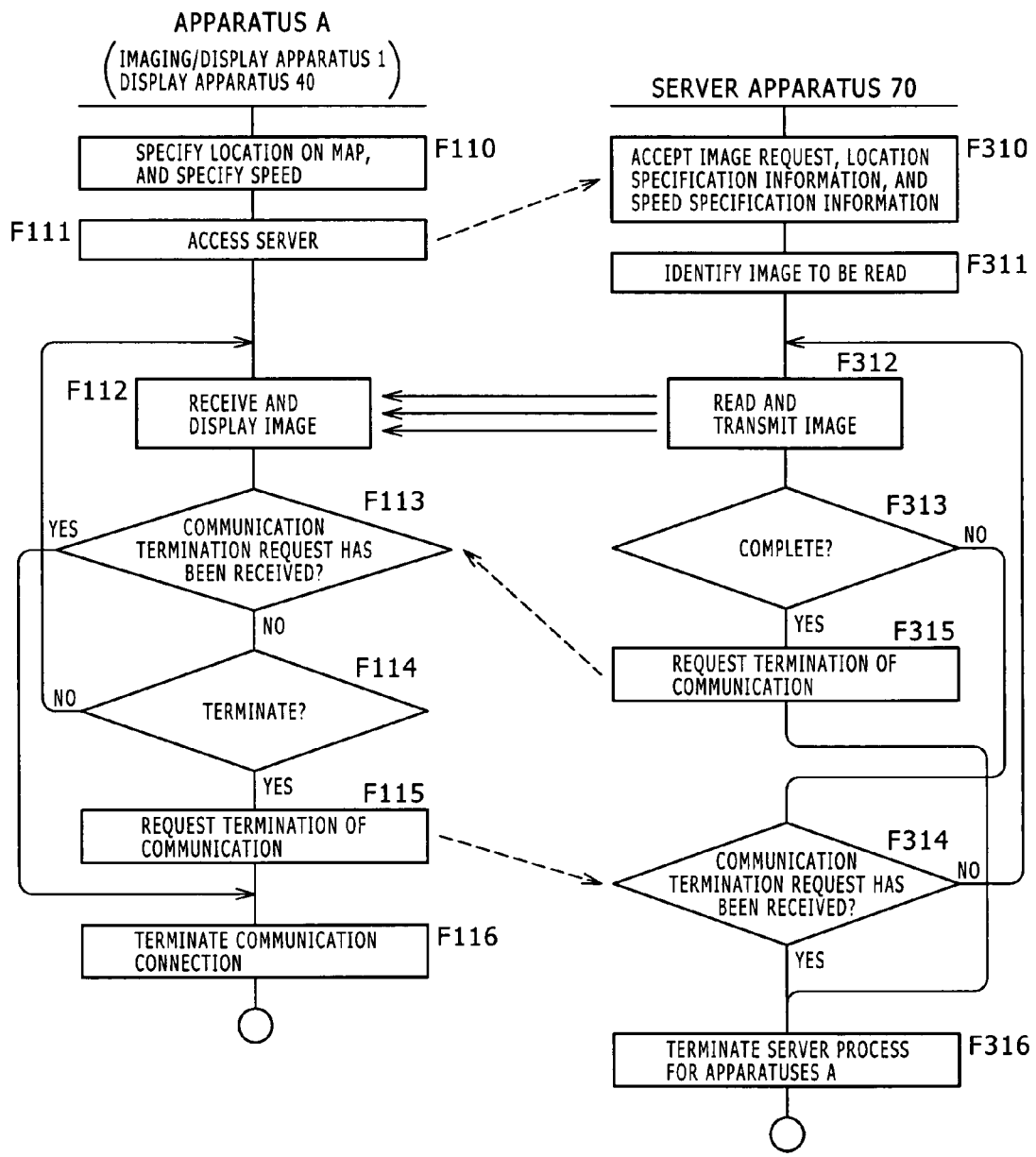
FIG. 13 is a flowchart of exemplary system operation II according to one embodiment of the present invention.

A procedure of the apparatus A illustrated in FIG. 13 can be considered as a control procedure performed by the system controller 10 of the imaging/display apparatus 1 or the display apparatus 40, whereas a procedure of the server apparatus 70 can be considered as a control procedure performed by the server control section 72.

First, at step F110, on the part of the apparatus A, the location specification process and the speed specification process are performed using the map image.

The location specification process and the speed specification process are similar to the processes performed at step F100 in FIG. 9 in exemplary system operation I described above. For example, the system controller 10 generates the location specification information based on a user input using the map images as illustrated in FIGS. 14A and 14B, and generates the speed specification information based on a user input for the screen displayed as illustrated in FIG. 14C or 14D.

After generating the location specification information and the speed specification information at step F110, the system controller 10 of the apparatus A accesses the server apparatus 70 at step F111. In other words, the system controller 10 of the apparatus A establishes the communication connection with the server apparatus 70. At this time, the system controller 10 of the apparatus A transmits the information of the image request, the location specification information, and the speed specification information to the server apparatus 70.

At step F310, the server control section 72 of the server apparatus 70 establishes the communication connection with the apparatus A, and accepts the image request, the location specification information, and the speed specification information.

Then, at step F311, the server control section 72 identifies image data to be read. Specifically, based on the received location specification information and speed specification information, the server control section 72 searches the speed image database in the network storage section 71 to extract an entry whose location information matches the location specification information and whose speed information matches the speed specification information.

Then, the server control section 72 identifies the image data of the extracted entry as the image data to be read.

Note that the meaning of the location information matching the location specification information is not limited to that the latitude and longitude of the location information and those of the location specification information coincide with each other completely, but may comprehend that the latitude and longitude of the location information falls within a predetermined range that can be considered as being close to the latitude and longitude of the location indicated by the location specification information. The predetermined range may be varied depending on the value of the speed specification information. For example, it is preferable that the predetermined range be wider as the specified speed becomes greater.

Also note that the meaning of the speed information matching the speed specification information is not limited to that a value of the speed information coincides with the speed value indicated by the speed specification information or falls within the range of speed values indicated by the speed specification information, but may comprehend that the value of the speed information falls within a predetermined range that can be considered as being close to the speed value or range of speed values indicated by the speed specification information.

Also note that a plurality of entries that match the location specification information and the speed specification information may be found. In this case, the date/time information may be referred to so that image data of an entry whose date/time information indicates the most recent date and time is selected as the image data to be read. Alternatively, all of the entries that match the location specification information and the speed specification information may be determined to be read sequentially.

Also note that no entry that matches the location specification information and the speed specification information may be found. This happens, for example, when no image data of an image taken at or near the location indicated by the location specification information has been uploaded by the apparatus B, or when although some image data uploaded matches the location specification information, none of the image data matches the speed specification information.

Although not shown in FIG. 13, in such cases, the server control section 72 notifies the apparatus A that no image data that matches the location specification information and the speed specification information has been found and, therefore, providing of an image is impossible. In response thereto, the apparatus A informs the user of the impossibility of the providing of an image, and finishes its procedure.

After searching the speed image database and identifying the entry (i.e., the image data) to be read, the server control section 72, at step F312, causes the image data identified as the image to be read to be read from the network storage section 71, and causes the read image data and audio data to be transmitted to the apparatus A via the communication section 73.

At step F112, the apparatus A receives and displays the image data transmitted from the server apparatus 70. That is, the system controller 10 of the apparatus A causes the image data (and the audio data) received and demodulated by the communication section 26 to be supplied to the image processing section 15 and the audio processing section 16, and causes the image data to be displayed on the display section 2 and the audio data to be outputted via the audio output section 5.

At step F113, the system controller 10 of the apparatus A monitors whether or not the communication termination request has been transmitted from the server apparatus 70.

At step F114, the system controller 10 of the apparatus A determines whether or not the displaying of the image should be terminated. For example, the system controller 10 of the apparatus A determines that the displaying of the image should be terminated when the user has performed the operation for terminating the displaying of the image using the operation input section 11. Also, the displaying of the image may be automatically terminated when the reception and displaying of the image data has continued for a predetermined period of time.

The system controller 10 of the apparatus A continues to display the image data (and output the audio data) received at step F112 until it is determined at step F113 that the communication termination request has been received or it is determined at step F114 that the displaying of the image should be terminated.

At step F313, the server apparatus 70 monitors whether the reading of the image data of the entry to be read has been completed. At step F314, the server apparatus 70 monitors whether the communication termination request has been received from the apparatus A. The server apparatus 70 continues to read and transmit the image data (and the audio data) until it is determined at step F313 that the reading of the image data has been completed or it is determined at step F314 that the communication termination request has been received.

Therefore, during this period, the user of the apparatus A is able to watch an image of an actual scene that was taken in the past by the apparatus B that was located at or near the location specified by the user using the map image and was moving at the specified speed.

If it is determined at step F114 that the displaying of the image should be terminated based on the user operation or another condition for termination, the system controller 10 of the apparatus A proceeds to step F115, and causes the communication termination request to be transmitted to the server apparatus 70 via the communication section 26, and then proceeds to step F116. Upon receipt of the communication termination request, the server apparatus 70 proceeds from step F314 to F316.

If it is determined that the reading and transmission of the entry to be read has been completed, the server control section 72 proceeds from step F313 to F315, and causes the communication termination request to be transmitted to the apparatus A via the communication section 73. Upon receipt of the communication termination request, the system controller 10 of the apparatus A proceeds from step F113 to F116.

Then, at step F116, the system controller 10 of the apparatus A performs a process of terminating the communication connection with the server apparatus 70. At step F316, the server control section 72 of the server apparatus 70 terminates the communication with and the server process for the apparatus A. Thus, the system operation is finished.

According to the above-described procedures, by specifying a certain location arbitrarily using the map image and specifying an arbitrary speed, the user of the apparatus A is able to watch the image of the scene taken by the apparatus B that was located near the specified location and moving at the specified speed with the apparatus A which the user is wearing or carrying.

Referring to FIGS. 15A and 15B, if the user of the apparatus A specifies a point on a certain road on the map and specifies a certain speed, for example, the user can see an image of a scene viewed from an automobile or the like that was moving in the past at the specified speed at the specified point. Such images are, for example, images that were taken by the imaging apparatus 30 attached to, for example, the automobile, or the imaging apparatus 30 or the imaging/display apparatus 1 worn by a driver of the automobile that was moving at the specified speed (or that was not moving, in the case where the specified speed is zero) near the specified point.

Referring to FIG. 15C, if the user of the apparatus A specifies a point on a certain railway track on the map and specifies a certain speed, for example, the user can see an image taken by the apparatus B such as the imaging apparatus 30 attached to a railway vehicle that was traveling in the past at the specified point, or the imaging apparatus 30 or imaging/display apparatus 1 that was worn by a train driver of the railway vehicle.

Referring to FIG. 15D, if the user of the apparatus A specifies a point in a certain resort on the map and specifies a human walking speed, for example, the user can see an image taken by the apparatus B such as the imaging apparatus 30 or imaging/display apparatus 1 that was worn by a person who was walking at the specified point in the past.

As in the above examples, by specifying a point on the map and specifying a moving speed, the user of the apparatus A can see an image that was actually taken by the apparatus B that was moving in the past at the specified speed at the specified point.

While it has been assumed in the foregoing description that the user of the apparatus A specifies the location and speed, the user may be allowed to additionally specify a date and time at step F110 in FIG. 13.

As described above, at step F110, the system controller 10 generates the location specification information in accordance with the user's operation of specifying the location while the map image is being displayed, and asks the user to enter the speed either using a menu or by inputting a numerical value and generates the speed specification information in accordance with the entered speed. At this time, the system controller 10 may additionally ask the user to specify and enter the date and time either using a menu or by inputting a numerical value, for example.

For example, the user may be allowed to specify and enter a specific year, month, and day, a specific time, or the like, or to specify and enter a certain date range (e.g., from a certain day of a certain month to a certain day of a certain month) or a certain time range (e.g., from a certain hour to another hour). Further, the user may be allowed to select a search condition based on the entered date and time. Examples of such search conditions include "including the specified date/time", "within the specified date/time range", "before the specified date/time", and "after the specified date/time". Then, the system controller 10 sets the specified date/time or a combination of the specified date/time and the search condition as date/time specification information.

In this case, when accessing the server apparatus 70 at step F111, the system controller 10 of the apparatus A transmits the date/time specification information as well as the location specification information and the speed specification information. At step F310, the server control section 72 accepts the date/time specification information as well as the location specification information and the speed specification information.

Then, at step F311, the server control section 72 searches the speed image database using the location specification information, the speed specification information, and the date/time specification information.

Specifically, the server control section 72 extracts entries whose location information and speed information in the speed image database match the location specification information and the speed specification information, respectively, and further extracts therefrom an entry whose date/time information in the speed image database matches the date/time specification information.

By performing a search in the above-described manner, the server control section 72 extracts an entry that matches the speed, location, and imaging date/time specified by the user, and identifies image data of that entry as the image to be read.

As described above, by specifying the date/time, the user of the apparatus A is able to selectively watch an image taken at the specified date/time.

For example, from among scenes taken at a certain place at a certain moving speed, the user of the apparatus A is able to arbitrarily select and watch a scene taken in a certain period, a scene taken in the recent past, a scene taken before a certain time, a scene taken on a specific day, a scene taken at a specific time, a scene taken at night, or the like.

Thus, the user is able to watch a greater variety of scenes taken at an arbitrary place at an arbitrary moving speed.

[6. Effects of Embodiments, Exemplary Variants, and Exemplary Expansions]

Embodiments of the present invention have been described above. The user of the imaging/display apparatus 1 or display apparatus 40 corresponding to the apparatus A is able to see, by specifying a speed and a location, an image actually taken by the imaging apparatus 30 in a situation that matches the specified location and speed. Thus, a system and apparatus that satisfy a variety of needs of users are achieved. Examples of such needs include a desire to watch and enjoy a scene that could be seen when traveling at a certain place at a certain speed, and a desire to know a scene viewed in such a situation.

Scenes that people can actually experience will give very different impressions depending on the moving speed. Accordingly, the ability to specify a speed and experience a scene that could be viewed when traveling at the specified speed may give the user a chance to enjoy a very entertaining image of the scene, or the user may find that image to be useful information.

Further, by specifying a moving speed of 180 km/h or more, for example, the user is able to watch a motorsport such as a car race or a bike race.

Still further, when the present invention is applied to an in-vehicle navigation system, the user is able to see a scene at an arbitrary location in advance almost as if the user were seeing the scene while actually driving the automobile near that location. This is very useful as a guide for the user.

The moving speed generally fluctuates and may become zero in front of a traffic light, for example. Therefore, not only the instantaneous speed but also various types of speeds, such as an average speed in a certain period of time, a so-called standard speed, and the greatest speed, may be used. For example, the speed information of the apparatus B managed by the server apparatus 70 may be one of the instantaneous speed, the average speed, the standard speed, the greatest speed, and so on. Alternatively, two or more of the instantaneous speed, the average speed, the standard speed, the greatest speed, and so on of the apparatus B may be managed by the server apparatus 70. Further, the speed specified by the user of the apparatus A may be any of the instantaneous speed, the average speed, the standard speed, and the greatest speed.

Further, the ability to specify a location and see an image taken at the specified location allows the user to know, as circumstances of the specified location, a geographic feature thereof, a view of a nearby building or natural object, the width of a road or the number of lanes, a state that varies depending on the date and time, or the like, for example. Thus, when the present invention is applied to the so-called navigation system, it is possible to provide an expansive information providing service.

Still further, the ability to specify a location is useful when the user desires to check a current or past scene in a specific area. For example, in exemplary system operation I, the user can specify a certain point on a road to see a current view of congestion occurring near the specified point and thus recognize an actual state of the congestion in detail, or to see a view of congestion near a certain place at which an event is held and thus check the congestion. When the user desires to check the congestion, the user can select a moving speed of 1 km/h or less or a moving speed of 10 km/h or less, for example, to obtain a desired scene.

Still further, by seeing an image of an actual scene showing a current situation of a certain tourist resort, the user is able to check weather conditions, how far the coloring of the leaves in autumn has progressed, or the like. Still further, in accordance with exemplary system operation II, the user is able to check a past scene at a specified place.

As was described with respect to exemplary system operation II, the user can use the date/time specification information to select image data to be provided. Thus, the user is able to watch different images by specifying different date/time conditions.

For example, the user is able to specify and watch an image of a scene that could have been viewed in the past while moving, the image having been taken at a certain place before a certain time.

Since the imaging/display apparatuses 1 or imaging apparatuses 30 that function as the apparatus B can be placed on the movable bodies including people, there is no need to provide fixed equipment such as a so-called fixed camera.

The imaging/display apparatuses 1 or imaging apparatuses 30 placed on the movable bodies naturally take images while traveling over a variety of places. Therefore, in exemplary system operation II, it is easy to collect images actually taken at a variety of places and enrich the images registered in the speed image database.

While embodiments of the image display system, the display apparatus, and the display method according to the present invention have been described above, it will be appreciated that the present invention is not limited to the above-described embodiments but that there are a variety of variants and expansions.

There are a variety of possible structures and procedures of the imaging/display apparatus 1 and display apparatus 40 that function as the apparatus A, which corresponds to the display apparatus according to the present invention. Also, there are a variety of possible structures and procedures of the imaging/display apparatus 1 and imaging apparatus 30 that function as the apparatus B, which corresponds to the imaging apparatus as recited in the appended claims. Also, there are a variety of possible structures and procedures of the server apparatus 70.

It has been assumed in exemplary system operations I and II that the user of the apparatus A specifies the speed and location, and that the image data that matches the speed specification information and the location specification information is provided to the apparatus A. However, a procedure in which the user of the apparatus A specifies only the speed is also applicable.

Specifically, in this case, only the speed specification information is transmitted to the server apparatus 70 as a condition for selecting the image to be provided. In the case of exemplary system operation I, the camera location/speed management section 74 of the server apparatus 70 manages at least the current speed with respect to a large number of apparatuses B, and in the server apparatus 70, an apparatus B whose current speed matches the speed specification information is selected. Then, the image data is transferred from the selected apparatus B to the apparatus A.

Meanwhile, in the case of exemplary system operation II, the server apparatus 70 uses only the speed specification information when searching the speed image database for desired image data, and transmits image data that matches the speed specification information to the apparatus A.

That is, in this case, the user of the apparatus A can watch an image taken by an apparatus B placed on a movable body that is (or was) moving at the specified speed.

Similarly, a procedure in which the user of the apparatus A specifies a speed and a date/time and the image data that matches the speed specification information and the date/time specification information is provided to the apparatus A is also possible.

Still further, for example, not only normal imaging but also a variety of imaging operations may be performed to obtain images in the apparatus B so that the resultant image data is transmitted to the server apparatus 70. Also, a request for a variety of imaging operations may be transmitted from the apparatus A or the server apparatus 70 to the apparatus B. Examples of such a variety of imaging operations include: telephoto imaging; wide-angle imaging; imaging that involves zooming in or zooming out within a range between a telephoto extreme and a wide-angle extreme; imaging for a magnified image; imaging for a reduced image; imaging with a varied frame rate (e.g., imaging with a high frame rate, imaging with a low frame rate, etc.); imaging with increased brightness; imaging with reduced brightness; imaging with varied contrast; imaging with varied sharpness; imaging with increased imaging sensitivity; imaging with increased infrared imaging sensitivity; imaging with increased ultraviolet imaging sensitivity; imaging with a specific wavelength range cut off; imaging that involves application of an image effect, such as mosaicing for the picked-up image data, a brightness reversing process, a soft-focus process, highlighting a part of the image, or varying overall color atmosphere of the image; and stroboscopic imaging.

Still further, in exemplary system operation II, the server apparatus 70 may generate a counterfeit image that appears to have been taken by an apparatus B moving at the specified speed, and transmit the counterfeit image to the apparatus A.

Suppose, for example, that the speed specification information indicative of a moving speed of 100 km/h is transmitted from the apparatus A and image data of an image taken at a speed of 50 km/h exists in the speed image database. In this case, the server apparatus 70 may transmit that image data to the apparatus A so that the image data will be played back at double speed. In such a manner, a counterfeit image that appears to have been taken at 100 km/h can be provided to the user of the apparatus A.

Still further, in the apparatus A, the image data transmitted from the server apparatus 70 may be stored in the storage section 25. The system controller 10 stores the received image data in the storage section 25 so as to be associated the speed information (e.g., the speed specification information set at step F100 in FIG. 9 or step F110 in FIG. 13). Needless to say, the received image data stored in the storage section 25 may be associated with location information as well.

As a result, the user can replay the image data stored in the storage section 25 by specifying a speed at any subsequent time.

Still further, the user of the apparatus A may be allowed to specify a direction of movement from a certain point.

In this case, in the apparatus B, the location detection section 12 detects the direction of movement as well, and the direction of movement is transmitted to the server apparatus 70 together with the speed information.

Thus, by specifying a direction of movement as an additional search condition, the user of the apparatus A is able to request the server apparatus 70 to select image data of an image taken by an apparatus B moving in the specified direction of movement at the specified speed.

For example, scenes seen on a certain road that runs in a north-south direction will differ depending on whether the apparatus B imaging the scenes are moving northward or southward. When the user of the apparatus A specifies the direction of movement as an additional search condition, image data that matches the user-specified direction of movement will be retrieved and provided to the apparatus A.

In the above-described embodiments, the user specifies the location using the map image. Examples of the map image include not only images of "maps" showing roads, geographic features, buildings, natural objects, and so on on the ground but also images of a variety of figures that can be used when specifying a specific location, such as an ocean chart, an undersea topographic map, an aeronautical chart, and a space chart.

That is, while it has been assumed in the above-described embodiments that the user specifies the location using a ground map image, the ocean chart, the undersea topographic map, the aeronautical chart, the space chart, or the like may be used to specify a certain location.

In the case of exemplary system operation II, for example, the server apparatus 70 may register image data of images taken at the watercraft, the submarine, the aircraft, the satellite, and so on in the speed image database together with their speed information, location information, and so on. In this case, the server apparatus 70 is able to search for an appropriate image based on a location specified by the user using the ocean chart, the undersea topographic map, the aeronautical chart, the space chart, or the like, and provide the image found to the apparatus A. It will be appreciated that location information concerning a location beneath the sea, in the air, in space, or the like may include not only information of the latitude and longitude but also information of an altitude or a depth.

In the case of exemplary system operation I, as a result of the user specifying a location using the ocean chart, for example, and specifying a speed, an apparatus B that is mounted on a watercraft that is traveling in a see area corresponding to the specified location at a speed corresponding to the specified speed can be selected, so that image data of an image being taken by the selected apparatus B is transmitted to the apparatus A. Similarly, the user can specify a certain location on an orbit of the satellite using the space chart, for example, and specify a speed to watch an image taken at the satellite traveling at or near the specified location at the specified speed.

It has been assumed in the above-described embodiments that the image data and the audio data are provided from the apparatus B to the apparatus A via the server apparatus 70. Note, however, that only the image data may be provided in another embodiment of the present invention.

Also note that the present invention may be applied to a system that handles only the audio data.

What is claimed is:

1. An image display system, comprising:
a display apparatus;
an imaging apparatus to be placed on a movable body for imaging; and
a server apparatus, wherein
each of said display apparatus and said imaging apparatus is capable of communicating with said server apparatus,
said imaging apparatus includes:
an imaging section configured to take an image to obtain image data,
a speed detection section configured to detect a moving speed of the movable body and generate speed information indicative of the moving speed, and
a control section configured to perform a transmission control process of causing the image data obtained by the imaging section and the speed information generated by the speed detection section to be transmitted to said server apparatus,
said server apparatus includes:
a movable body speed management section configured to manage the moving speed of the movable body on which said imaging apparatus is placed using the speed information transmitted from said imaging apparatus, and
a control section configured to perform a camera identification process of, based on speed specification information transmitted from said display apparatus, checking the moving speed of the movable body managed by the movable body speed management section and identifying an imaging apparatus that matches the speed specification information, and a transfer control process of causing image data to be transferred from the identified imaging apparatus to said display apparatus, and
said display apparatus includes:
a display section configured to perform image display, and
a control section configured to perform a speed specification process of setting the speed specification information based on a user input, an image request transmission process of transmitting the speed specification information to said server apparatus to make a request for the image data, and a display process of receiving the image data transmitted from said server apparatus in response to the image request transmission process and causing the display section to perform a display operation based on the received image data.

2. The image display system according to claim 1, wherein said imaging apparatus further includes:
a location detection section configured to detect location information, and as the transmission control process, the control section of said imaging apparatus additionally performs a process of causing the location information detected by the location detection section to be transmitted to said server apparatus,
the movable body speed management section of said server apparatus manages the moving speed and location of the movable body on which said imaging apparatus is placed using the speed information and the location information transmitted from said imaging apparatus,
the control section of said display apparatus performs a location specification process of setting location specification information for specifying a location, and, in the image request transmission process, transmits the speed specification information and the location specification information to said server apparatus, and
in the camera identification process, the control section of said server apparatus identifies the imaging apparatus based on the speed specification information and the location specification information transmitted from said display apparatus.

3. The image display system according to claim 1, wherein the movable body is one of a person, a non-human creature, a first device that travels on the ground, a second device that travels on a sea surface, a third device that travels beneath the sea surface, a fourth device that travels through the air, and a fifth device that travels outside the atmosphere of the earth.

4. An image display system, comprising:
a display apparatus;
an imaging apparatus to be placed on a movable body for imaging; and
a server apparatus, wherein
each of said display apparatus and said imaging apparatus is capable of communicating with said server apparatus,
said imaging apparatus includes:
an imaging section configured to take an image to obtain image data,
a speed detection section configured to detect a moving speed of the movable body and generate speed information indicative of the moving speed, and
a control section configured to perform a transmission control process of causing the image data obtained by the imaging section and additional data that includes at least the speed information generated by the speed detection section when the image data was obtained by imaging to be transmitted to said server apparatus,
said server apparatus includes:
a storage section configured to store the image data and the additional data transmitted from said imaging apparatus, and
a control section configured to perform a search/transmission control process of searching through the image data stored in the storage section based on speed specification information transmitted from said display apparatus, and causing image data found to be read from the storage section and transmitted to said display apparatus, and
said display apparatus includes:
a display section configured to perform image display, and
a control section configured to perform a speed specification process of setting the speed specification information based on a user input, an image request transmission process of transmitting the speed specification information to said server apparatus to make a request for the image data, and a display process of receiving the image data transmitted from said server apparatus in response to the image request transmission process and causing the display section to perform a display operation based on the received image data.

5. The image display system according to claim 4, wherein said imaging apparatus further includes:
a location detection section configured to detect location information, and the control section of said imaging apparatus allows the additional data to include the location information detected by the location detection section when the image data was obtained by imaging,
the control section of said display apparatus performs a location specification process of setting location specification information for specifying a location, and, in the image request transmission process, transmits the speed specification information and the location specification information to said server apparatus, and
in the search/transmission control process, the control section of said server apparatus searches through the image data stored in the storage section using the speed specification information and the location specification information transmitted from said display apparatus.

6. The image display system according to claim 4, wherein said imaging apparatus further includes:
a date/time detection section configured to detect a current date and time and generate date/time information indicative of the current date and time detected, and the control section of said imaging apparatus allows the additional data to include the date/time information generated by the date/time detection section when the image data was taken,
the control section of said display apparatus performs a date/time specification process of setting date/time specification information for specifying a date and time, and, in the image request transmission process, transmits the speed specification information and the date/time specification information to said server apparatus, and
in the search/transmission control process, the control section of said server apparatus searches through the image data stored in the storage section using the speed specification information and the date/time specification information transmitted from said display apparatus.

7. The image display system according to claim 4, wherein the movable body is one of a person, a non-human creature, a first device that travels on the ground, a second device that travels on a sea surface, a third device that travels beneath the sea surface, a fourth device that travels through the air, and a fifth device that travels outside the atmosphere of the earth.

* * * * *